US010193983B2

(12) United States Patent
Furukawa

(10) Patent No.: US 10,193,983 B2
(45) Date of Patent: Jan. 29, 2019

(54) INFORMATION DISTRIBUTION DEVICE INFORMATION RECEPTION DEVICE, INFORMATION DISTRIBUTION METHOD, AND RECORDING MEDIUM

(71) Applicant: NEC Corporation, Tokyo (JP)

(72) Inventor: Ryo Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 200 days.

(21) Appl. No.: 14/651,456

(22) PCT Filed: Dec. 6, 2013

(86) PCT No.: PCT/JP2013/007189
§ 371 (c)(1),
(2) Date: Jun. 11, 2015

(87) PCT Pub. No.: WO2014/097567
PCT Pub. Date: Jun. 26, 2014

(65) Prior Publication Data
US 2015/0319255 A1    Nov. 5, 2015

(30) Foreign Application Priority Data
Dec. 19, 2012 (JP) .................................. 2012-277013

(51) Int. Cl.
*G06F 15/16* (2006.01)
*H04L 29/08* (2006.01)
(Continued)

(52) U.S. Cl.
CPC ............. *H04L 67/16* (2013.01); *G06F 17/30* (2013.01); *G06Q 30/02* (2013.01); *H04L 67/10* (2013.01); *H04L 67/22* (2013.01); *H04L 67/306* (2013.01)

(58) Field of Classification Search
CPC ......... H04L 67/16; H04L 67/10; H04L 67/22; G06F 17/30; G06Q 30/02
(Continued)

(56) References Cited

U.S. PATENT DOCUMENTS

2007/0060099 A1* 3/2007 Ramer .............. G06F 17/30867
455/405
2008/0228394 A1 9/2008 Fukuda et al.
(Continued)

FOREIGN PATENT DOCUMENTS

EP          1970852 A2    9/2008
JP       2002-150110 A    5/2002
(Continued)

OTHER PUBLICATIONS

International Search Report corresponding to PCT/JP2013/007189 dated Mar. 11, 2014 (2 pages).

*Primary Examiner* — Alan S Chou
(74) *Attorney, Agent, or Firm* — Wilmer Cutler Pickering Hale and Dorr LLP

(57) ABSTRACT

An information distribution device includes: an action information collection unit that collects action information from an action information transmission device; a rules construction unit that, on the basis of a plurality of related pieces of action information constructs personalization rules including a selection condition and selection information; a rules transmission unit that transmits the personalization rules to an information reception device; and a distribution information transmission unit that transmits distribution information stored in a distribution information storage unit to the information reception device. The information reception device includes a filtering unit, which extracts, from the personalized rules received by a rules reception unit, personalization rules including a selection condition that matches the action information acquired by an action infor-
(Continued)

mation unit, and which selects, from the distribution information received by a distribution information reception unit, the distribution information indicated by the selection information in the extracted personalized rules.

12 Claims, 24 Drawing Sheets

(51) Int. Cl.
    *G06Q 30/02*     (2012.01)
    *G06F 17/30*     (2006.01)
(58) Field of Classification Search
    USPC .......................................................... 709/203
    See application file for complete search history.

(56) References Cited

U.S. PATENT DOCUMENTS

2011/0246561 A1    10/2011    Eshima et al.
2011/0246882 A1*  10/2011    Kollenkark ....... G06F 17/30035
                                                             715/716

FOREIGN PATENT DOCUMENTS

| JP | 2003-242411 A | 8/2003 |
|----|---------------|--------|
| JP | 2003-256713 A | 9/2003 |
| JP | 2008-234063 A | 10/2008 |
| JP | 2010-198243 A | 9/2010 |
| JP | 2011-215964 A | 10/2011 |

* cited by examiner

Fig. 9

| TYPE OF ACTION | TIME OF ACTION | DESCRIPTION OF ACTION |
|---|---|---|
| VIEWING INFORMATION | 10:00~11:00 | 3ch |
| VIEWING INFORMATION | 11:00~12:00 | 5ch |
| RESPONSE TO ADVERTISEMENT | 11:30 | SOCCER TICKET |
| ... | ... | ... |

Fig. 10

| USER ID | TYPE OF ACTION | TIME OF ACTION | DESCRIPTION OF ACTION |
|---|---|---|---|
| USER 1 | VIEWING INFORMATION | 10:00~11:00 | 3ch |
| USER 1 | VIEWING INFORMATION | 11:00~12:00 | 5ch |
| USER 1 | RESPONSE TO ADVERTISEMENT | 11:30 | SOCCER TICKET |
| USER 2 | VIEWING INFORMATION | 10:00~11:00 | 3ch |
| USER 2 | VIEWING INFORMATION | 12:00~13:00 | 1ch |
| USER 2 | RESPONSE TO ADVERTISEMENT | 10:10 | SOCCER TICKET |
| USER 2 | RESPONSE TO ADVERTISEMENT | 15:30 | IDOL'S CD |
| USER 3 | VIEWING INFORMATION | 8:00~9:00 | 6ch |
| USER 3 | VIEWING INFORMATION | 10:00~11:00 | 3ch |
| ... | ... | ... | ... |

Fig. 11A

| ACTION INFORMATION OF TYPE "VIEWING INFORMATION" | | ACTION ATTRIBUTE INFORMATION |
|---|---|---|
| TIME OF ACTION | DESCRIPTION OF ACTION | |
| 10:00~11:00 | 1ch | CHILDREN'S PROGRAM |
| 10:00~11:00 | 2ch | NEWS PROGRAM |
| 10:00~11:00 | 3ch | SOCCER PROGRAM |
| 10:00~11:00 | 4ch | INFORMATION PROGRAM |
| 10:00~11:00 | 5ch | COOKING PROGRAM |
| 10:00~11:00 | 6ch | MUSIC PROGRAM |
| 11:00~12:00 | 1ch | DRAMA |
| 11:00~12:00 | 2ch | CHILDREN'S PROGRAM |
| 11:00~12:00 | 3ch | BASEBALL PROGRAM |
| 11:00~12:00 | 4ch | QUIZ SHOW |
| 11:00~12:00 | 5ch | COMEDY PROGRAM |
| 11:00~12:00 | 6ch | DOCUMENTARY PROGRAM |
| ... | ... | ... |

Fig. 11B

| ACTION INFORMATION OF TYPE "REACTION TO ADVERTISEMENT" | ACTION ATTRIBUTE INFORMATION |
|---|---|
| DESCRIPTION OF ACTION | |
| SOCCER TICKET | SOCCER INFORMATION |
| IDOL'S CD | J-POP INFORMATION |
| BASEBALL TICKET | BASEBALL INFORMATION |
| GAME SOFTWARE | TOY INFORMATION |
| GOLF CLUB | GOLF INFORMATION |
| ... | ... |

Fig. 12

| DISTRIBUTION INFORMATION | DISTRIBUTION ATTRIBUTE INFORMATION |
|---|---|
| SOCCER TICKET | SOCCER INFORMATION |
| SOCCER UNIFORM | SOCCER INFORMATION |
| PORTABLE GAME MACHINE | TOY INFORMATION |
| CARD GAME | TOY INFORMATION |
| GOLF WEAR | GOLF INFORMATION |
| ... | ... |

Fig. 14

| ACTION ATTRIBUTE INFORMATION OF FIRST TYPE "VIEWING INFORMATION" | ACTION ATTRIBUTE INFORMATION OF SECOND TYPE "REACTION TO ADVERTISEMENT" | COUNT |
|---|---|---|
| SOCCER PROGRAM | SOCCER INFORMATION | 1134 |
| MUSIC PROGRAM | J-POP INFORMATION | 823 |
| CHILDREN'S PROGRAM | TOY INFORMATION | 744 |
| CHILDREN'S PROGRAM | GOLF INFORMATION | 568 |
| SOCCER PROGRAM | GAME INFORMATION | 421 |
| ... | ... | ... |

Fig. 19

| PERSONALIZATION RULES | |
|---|---|
| SELECTION CONDITION | SELECTION INFORMATION |
| SOCCER PROGRAM | SOCCER INFORMATION |
| MUSIC PROGRAM | J-POP INFORMATION |
| CHILDREN'S PROGRAM | TOY INFORMATION |
| CHILDREN'S PROGRAM | GOLF INFORMATION |
| SOCCER PROGRAM | GAME INFORMATION |
| ... | ... |

Fig. 20

| TIME OF ACTION | DESCRIPTION OF ACTION |
|---|---|
| 10:00~11:00 | 1ch |
| 11:00~12:00 | 2ch |
| 13:00~14:00 | 6ch |
| ... | ... |

Fig. 22

| ACTION ATTRIBUTE INFORMATION | FREQUENCY OF OCCURRENCE |
|---|---|
| CHILDREN'S PROGRAM | 8 |
| QUIZ SHOW | 4 |
| COMEDY PROGRAM | 3 |
| ... | ... |

Fig. 23

| PROGRAM LIST | | | | |
|---|---|---|---|---|
| | | | | |
| PORTABLE GAME MACHINE ADVERTISEMENT | | CARD GAME ADVERTISEMENT | | GOLF WEAR ADVERTISEMENT |

…

INFORMATION DISTRIBUTION DEVICE INFORMATION RECEPTION DEVICE, INFORMATION DISTRIBUTION METHOD, AND RECORDING MEDIUM

CROSS-REFERENCE TO RELATED APPLICATIONS

This application is a national stage application of International Application No. PCT/JP2013/007189 entitled "Information Distribution Device, Information Reception Device, Action Information Transmission Device, Information Distribution System, Information Distribution Method, and Storage Medium" filed on Dec. 6, 2013, which claims priority to Japanese Application No. 2012-277013 filed on Dec. 19, 2012, the disclosures of which are hereby incorporated by reference in their entirety.

TECHNICAL FIELD

The present invention relates to a technique to distribute information to user terminals.

BACKGROUND ART

Information distribution systems that select distribution information on the basis of action information representing an action of a user and transmit the selected distribution information to a terminal of the user are known (see PTL 1, for example).

In the information distribution system described in PTL 1, information representing the position of a user terminal and information representing merchandise purchased by the user are used as action information. In the related technique, a server device has a registered user file, a purchase history file, a mobility pattern file, and an advertisement request file which contains distribution information representing advertisements. The registered user file is a file in which users who own user terminals are registered, and a purchase history file is a file in which purchase histories of the users are recorded. The mobility pattern file is a file in which users' mobility patterns based on histories of positional information of the user terminals are recorded. The server device extracts users to whom distribution information is to be transmitted on the basis of the purchase history file, the mobility pattern file and the advertisement request file. With this, the information distribution system can transmit distribution information selected on the basis of the purchase history and mobility pattern of a user to the user terminals. Distribution information selected on the basis of user's action information in this way will be hereinafter also referred to as personalized distribution information. A service that transmits personalized distribution information to user terminals will be also referred to as a personalized service.

In the personalized service described above, user's action information is privacy information for the user who provides the information. Accordingly, users may feel a strong reluctance to provide their action information to the information distribution system. However, in the information distribution system described in PTL 1, users who do not provide action information cannot receive personalized distribution information.

An information distribution system that addresses the problem is described in PTL 2. In the information distribution system, a user terminal holds distribution information and a selection logic. The selection logic is a logic for selecting distribution information on the basis of user's action information. The distribution information and the selection logic are distributed from a server beforehand. Such selection logics are generated beforehand by an analysis server which analyses action information acquired from a terminal of a subject. A user terminal collects action information of the user of the own device and applies the selection logic to the collected action information to select and output distribution information. This allows the user to acquire distribution information corresponding to the action information without providing the action information to the server.

CITATION LIST

Patent Literature

PTL 1: Japanese Laid-Open Patent Publication No. 2003-256713
PTL 2: Japanese Laid-Open Patent Publication No. 2003-242411

SUMMARY OF INVENTION

Technical Problem

However, the techniques described in PTL 1 and PTL 2 have the following problems.

The technique described in PTL 1 has a problem that personalized distribution information cannot be presented to users who do not provide action information.

The technique described in PTL 2 requires constructing selection logics with a high level of accuracy in order to present distribution information accurately suitable for a user who does not provide privacy information to the user. However, PTL 2 does not describe details of how to generate selection logics on the basis of action information acquired from terminals of subjects. Therefore, in the related technique, distribution information presented to a user who does not provide privacy information may not particularly suitable for the user, depending on the accuracy of the selection logic.

An object of the present invention is to provide a technique to present distribution information that is more accurately suitable for a user to the user in an information distribution system that provides personalized services while protecting user's privacy information.

Solution to Problem

An information distribution device according to an exemplary aspect of the present invention includes: an action information collection unit configured to collect action information from an action information transmission device transmitting action information representing an action of a user; a distribution information storage unit configured to store distribution information distributed to an information reception device; a personalization rules construction unit configured to extract a plurality of related pieces of action information from the action information collected by the action information collection unit, generate a selection condition based on information concerning at least one of the plurality of extracted pieces of action information, and generate, by using information concerning at least another of the plurality of extracted pieces of action information, selection information representing the distribution information in a selectable manner to construct personalization rules including the generated selection condition and the generated selection information; a personalization rules transmission unit configured to transmit the personalization rules constructed by the personalization rules construction unit to the information reception device; and a distribution information transmission unit configured to transmit distribution information stored in the distribution information storage unit to the information reception device.

An information reception device according to an exemplary aspect of the present invention includes: a personalization rules reception unit configured to receive the personalization rules from the information distribution device described above; a distribution information reception unit configured to receive the distribution information from the information distribution device; an action information acquisition unit configured to acquire action information representing an action of a user who uses the own device; a distribution information filtering unit configured to extract personalization rules including a selection condition that matches action information acquired by the action information acquisition unit from among personalization rules received by the personalization rules reception unit and select distribution information indicated by selection information included in the extracted personalization rules from distribution information received by the distribution information reception unit; and a distribution information presentation unit configured to output the distribution information selected by the distribution information filtering unit.

An action information transmission device according to an exemplary aspect of the present invention includes: an action information acquisition unit configured to acquire action information representing an action of a user who uses the own device; and an action information transmission unit configured to transmit the action information to the information distribution device described above.

An information distribution system according to an exemplary aspect of the present invention includes: the information distribution device described above; the information reception device described above; and the action information transmission device described above.

An information distribution method in an information distribution system including an information distribution device, an information reception device and an action information transmission device, according to an exemplary aspect of the present invention, includes the steps of: in the action information transmission device, acquiring action information representing an action of a user who uses the own device, and transmitting the action information to the information distribution device; in the information distribution device, storing distribution information in a distribution information storage unit included in the information distribution device, collecting action information from the action information transmission device, extracting a plurality of related pieces of action information from the collected action information, generating a selection condition based on information concerning at least one of the plurality of extracted pieces of action information, generating, by using information concerning at least another of the plurality of extracted pieces of action information, selection information representing the distribution information in a selectable manner to construct personalization rules including the generated selection condition and the generated selection information, transmitting the constructed personalization rules to the information reception device, and transmitting distribution information stored in the distribution information storage unit included in the information distribution device to the information reception device; and in the information reception device, receiving the personalization rules from the information distribution device, receiving the distribution information from the information distribution device, acquiring action information representing an action of a user who uses the own device, extracting personalization rules including a selection condition that matches the acquired action information from among received personalization rules, selecting distribution information indicated by selection information included in the extracted personalization rules from received distribution information, and outputting the selected distribution information.

A non-transitory computer-readable recording medium records a computer program causing a computer device to use a distribution information storage unit storing distribution information to execute: an action information collection step of collecting action information from an action information transmission device transmitting action information representing an action of a user; a personalization rules construction step of extracting a plurality of related pieces of action information from the action information collected at the action information collection step, generating a selection condition based on information concerning at least one of the plurality of extracted pieces of action information, generating, by using information concerning at least another of the plurality of extracted pieces of action information, selection information representing the distribution information in a selectable manner to construct personalization rules including the generated selection condition and the generated selection information; a personalization rules transmission step of transmitting the personalization rules constructed at the personalization rules construction step to the information reception device; and a distribution information transmission step of transmitting distribution information stored in the distribution information storage unit to the information reception device.

Advantageous Effects of Invention

The present invention can provide a technique to present distribution information that is more accurately suitable for a user to the user in an information distribution system that provides personalized services while protecting user's privacy information.

BRIEF DESCRIPTION OF DRAWINGS

FIG. 9 is a diagram illustrating an example of action information transmitted from an action information transmission device in the information distribution system according to the second exemplary embodiment of the present invention;

FIG. 10 is a diagram illustrating an example of information stored in an action information storage unit of an information distribution device in the information distribution system according to the second exemplary embodiment of the present invention;

FIG. 11A is a diagram illustrating an example of information stored in an action attribute information storage unit of the information distribution device in the information distribution system according to the second exemplary embodiment of the present invention;

FIG. 11B is a diagram illustrating another example of information stored in the action attribute information storage unit of the information distribution device in the information distribution system according to the second exemplary embodiment of the present invention;

FIG. 12 is a diagram illustrating an example of information stored in a distribution information storage unit of the information distribution device in the information distribution system according to the second exemplary embodiment of the present invention;

FIG. 14 is a diagram illustrating an example of the result of summing-up of combinations of first and second types of action attribute information by a personalization rules construction unit of the information distribution device in the information distribution system according to the second exemplary embodiment of the present invention;

FIG. 19 is a diagram illustrating an example of personalization rules constructed according to the second exemplary embodiment of the present invention;

FIG. 20 is a diagram illustrating an example of action information acquired by an action information acquisition unit of an information reception device according to the second exemplary embodiment of the present invention;

FIG. 22 is a diagram illustrating an example of the result of summing-up of action information by a distribution information filtering unit of the information reception device according to the second exemplary embodiment of the present invention;

FIG. 23 is a diagram illustrating an example of distribution information presented by a distribution information presentation unit of the information reception device according to the second exemplary embodiment of the present invention;

DESCRIPTION OF EMBODIMENTS

Exemplary embodiments of the present invention will be described below in detail with reference to drawings.

(First Exemplary Embodiment)

Figure 1:
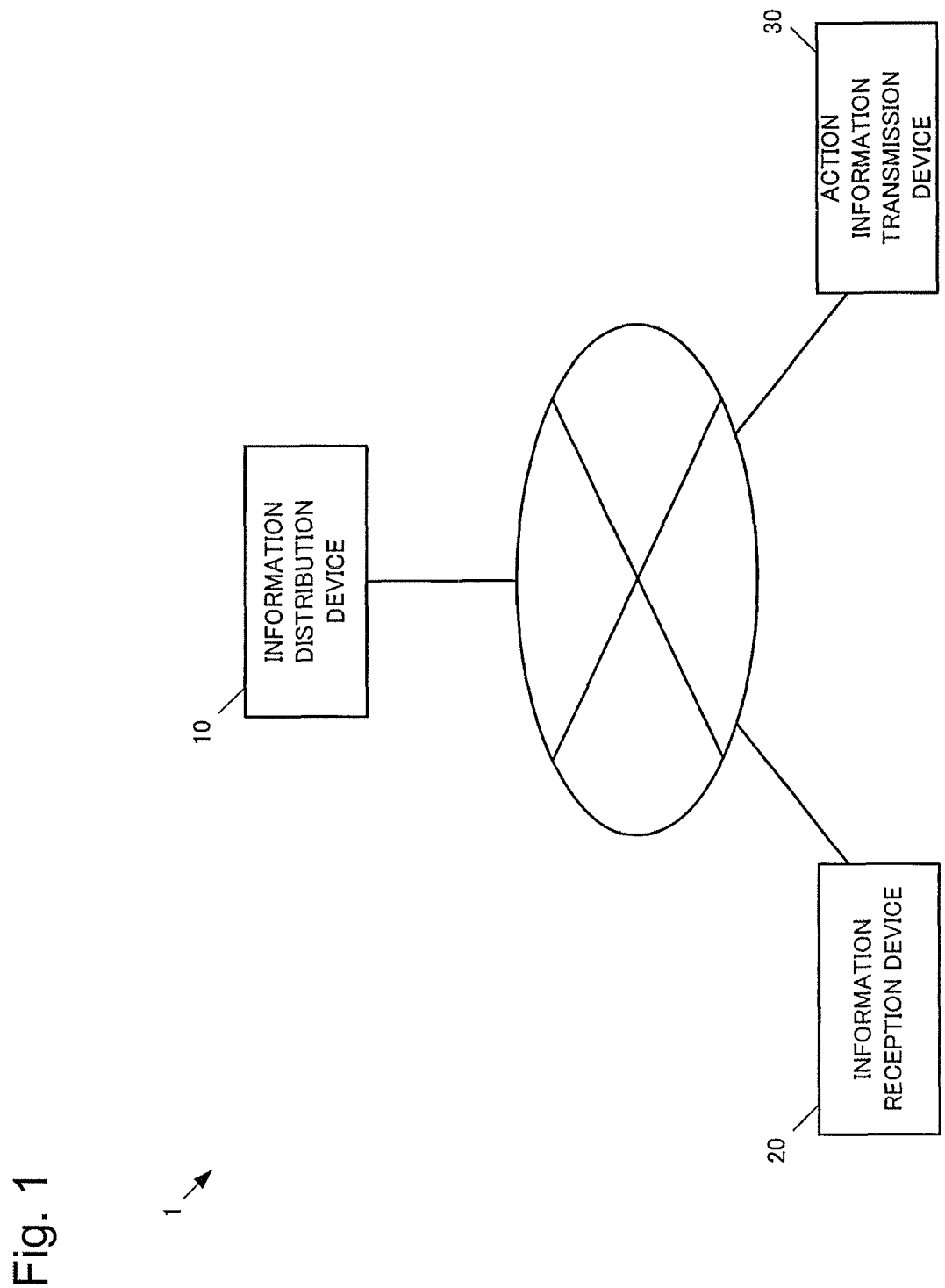
FIG. 1 is a block diagram illustrating a configuration of an information distribution system according to a first exemplary embodiment of the present invention.

FIG. 1 illustrates a configuration of an information distribution system 1 according to a first exemplary embodiment of the present invention. The information distribution system 1 in FIG. 1 includes an information distribution device 10, an information reception device 20, and an action information transmission device 30. The information distribution device 10 and the information reception device 20 are communicably interconnected through any of various types of networks such as an Internet, a LAN (Local Area Network), a public data network, a wireless communication network, or a combination of the networks. The information distribution device 10 and the action information transmission device 30 are communicably interconnected through any of various types of networks mentioned above. Note that the information distribution device 10, the information reception device 20 and the action information transmission device 30 in FIG. 1 are interconnected through the same network. However, the network that interconnects the information distribution device 10 and the information reception device 20 may be different from the network that interconnects the information distribution device 10 and the action information transmission device 30 in this exemplary embodiment. While one information distribution device 10, one information reception device 20 and one action information transmission device 30 are depicted in FIG. 1, this imposes no limitations on the numbers of information reception devices and action information transmission devices connected to the information distribution device in the information distribution system of the present invention.

Figure 2:
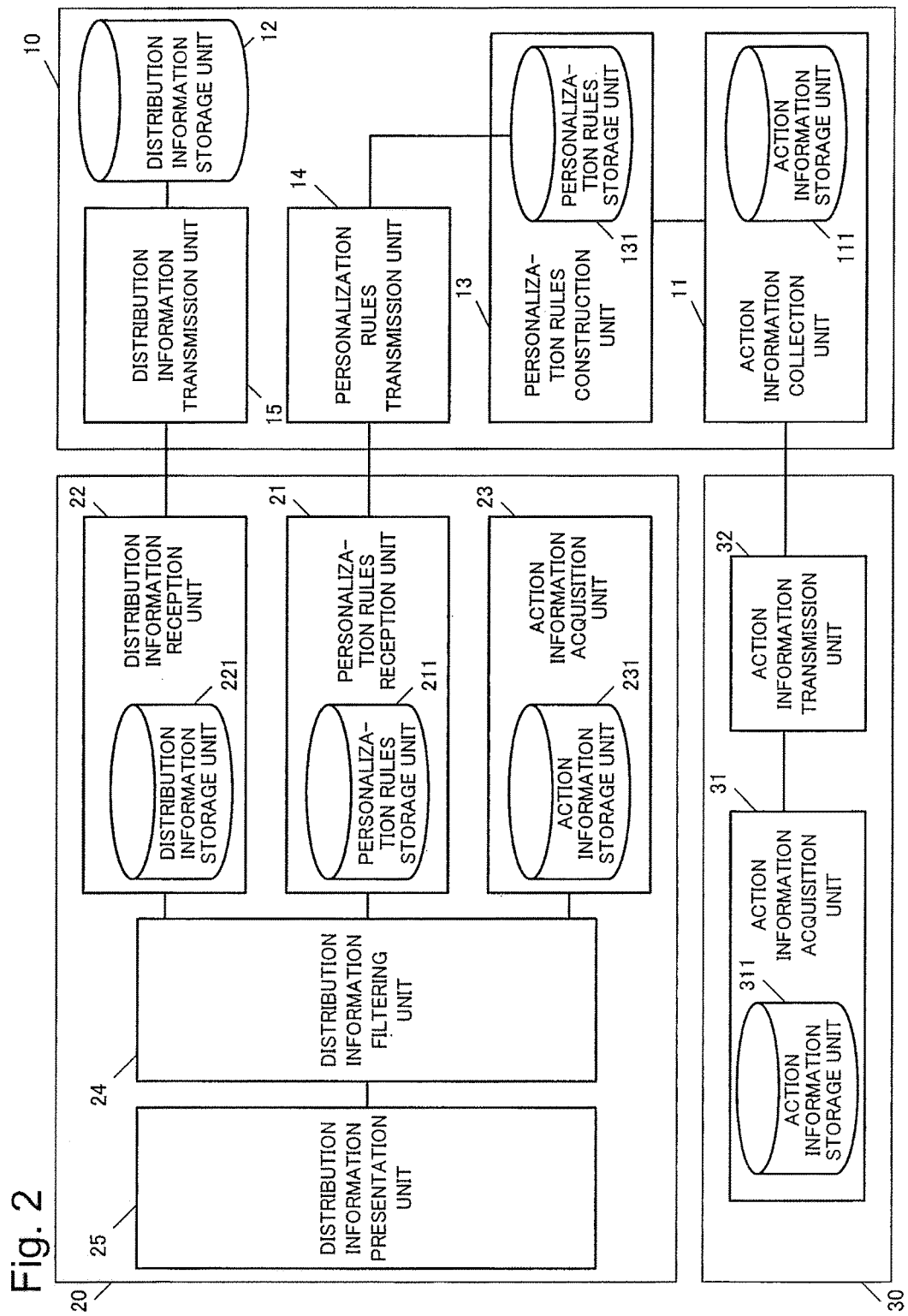
FIG. 2 is a functional block diagram illustrating functional configurations of devices making up the information distribution system according to the first exemplary embodiment of the present invention.

FIG. 2 illustrates functional block configurations of devices making up the information distribution system 1.

The information distribution device 10 in FIG. 2 includes an action information collection unit 11, a distribution information storage unit 12, a personalization rules construction unit 13, a personalization rules transmission unit 14, and a distribution information transmission unit 15. The information distribution device 10 can be implemented by a computer device including a CPU (Central Processing Unit), a RAM (Random Access Memory), a ROM (Read Only Memory), a storage device such as a hard disk, and a network interface. Each of the action information collection unit 11, the personalization rules transmission unit 14 and the distribution information transmission unit 15 in this case is composed of a network interface and a CPU. The CPU loads a computer program and various kinds of data stored in the ROM and the storage device into a RAM and executes the computer program. The distribution information storage unit 12 is implemented by a storage device. The personalization rules construction unit 13 is implemented by a CPU that loads a computer program and various kinds of data stored in a ROM and a storage device into a RAM and executes the computer program. Note that the hardware configurations of the information distribution device 10 and its functional blocks are not limited to the configurations described above.

The information reception device 20 in FIG. 2 includes a personalization rules reception unit 21, a distribution information reception unit 22, an action information acquisition unit 23, a distribution information filtering unit 24 and a distribution information presentation unit 25. The information reception device 20 can be implemented by a computer device including a CPU, a RAM, a ROM, a storage device such as a hard disk, a network interface, an input device, and a display device. Each of the personalization rules reception unit 21 and the distribution information reception unit 22 in this case includes a network interface and a CPU that loads a computer program and various kinds of data stored in a ROM and a storage device into a RAM and executes the computer program. Each of the action information acquisition unit 23 and the distribution information filtering unit 24 is implemented by a CPU that loads a computer program and various kinds of data stored in a ROM and a storage device into a RAM and executes the computer program. The distribution information presentation unit 25 includes a display device and a CPU that loads a computer program and various kinds of data stored in a ROM and a storage device into a RAM and executes the computer program. Note that the hardware configurations of the information reception device 20 and its functional blocks are not limited to the configurations described above.

The action information transmission device 30 in FIG. 2 includes an action information acquisition unit 31 and an action information transmission unit 32. The action information transmission device 30 can be implemented by a computer device including a CPU, a RAM, a ROM and a storage device such as a hard disk, a network interface, an input device, and a display device. The action information acquisition unit 31 is implemented by a CPU that loads a computer program and various kinds of data stored in a ROM and a storage device into a RAM and executes the computer program. The action information transmission unit 32 is composed of a network interface and a CPU that loads a computer program and various kinds of data stored in a ROM and a storage device into a RAM and executes the computer program. Note that the hardware configurations of the action information transmission device 30 and its functional blocks are not limited to the configurations described above.

Details of the functional blocks of the information distribution system 1 will be described below.

Details of the functional blocks of the action information transmission device 30 will be described first.

The action information acquisition unit 31 acquires action information which represents an action of a user who uses the own device. Action information here is information representing actions of a user who uses the action information transmission device 30. For example, action information may be information representing a history of browsing contents and advertisement information using a content viewing unit (not depicted) included in the action information transmission device 30. The action information acquisition unit 31 may acquire action information from an action information storage unit 311 in which such action information is stored.

The action information transmission unit 32 transmits action information acquired by the action information acquisition unit 31 to the information distribution device 10.

Details of the functional blocks of the information distribution device 10 will be described next.

The action information collection unit 11 collects action information from the action information transmission device 30. When the information distribution device 10 is communicably connected to one or more action information transmission devices 30, the action information collection unit 11 receives action information from action information transmission device(s) 30. The action information collection unit 11 may include, for example, an action information storage unit 111 implemented by a storage device and may store collected action information in the action information storage unit 111.

The distribution information storage unit 12 stores distribution information to be distributed to the information reception device 20. The distribution information may be information representing advertisements or coupons, for example.

The personalization rules construction unit 13 constructs personalization rules on the basis of action information collected by the action information collection unit 11. Specifically, the personalization rules construction unit 13 constructs personalization rules as follows. The personalization rules construction unit 13 extracts a plurality of related pieces of action information from action information collected by the action information collection unit 11. The personalization rules construction unit 13 then generates a selection condition on the basis of information concerning at least one of the plurality of extracted pieces of action information. Additionally, the personalization rules construction unit 13 uses information concerning at least another of the plurality of extracted pieces of action information to generate selection information that represents distribution information in a selectable manner. The personalization rules construction unit 13 then constructs personalization rules including the selection condition and the selection information. The personalization rules construction unit 13 may include, for example, a personalization rules storage unit 131 implemented by a storage device and may store the constructed personalization rules in the personalization rules storage unit 131.

Assume for example that action information representing the actions of viewing various kinds of contents and action information representing the actions of browsing various kinds of advertisement information are collected by the action information collection unit 11 and stored in the action information storage unit 111. Furthermore, assume that each piece of action information includes the time information representing the time at which the action represented by the piece of action information was performed and information identifying the action information transmission device 30 that has transmitted the piece of action information. In this case, the personalization rules construction unit 13 may extract the following action information as a plurality of related pieces of action information from action information transmitted from the same action information transmission device 30. Action information extracted as a plurality of related pieces of action information is action information representing a viewing action and action information representing a browsing action that can be determined to be actions performed in association on the basis of time information. Suppose, for example, that action information representing the action of viewing a soccer content and action information representing the action of browsing advertisement information about soccer tickets. In this case, the personalization rules construction unit 13 may generate a selection condition indicating action information representing the action of viewing the soccer content as a selection condition based on information concerning one piece of action information among a plurality of extracted pieces of action information. Furthermore, the personalization rules construction unit 13 in this case may use information concerning another piece of action information among the plurality of extracted pieces of action information to generate selection information indicating the advertisement information about soccer tickets as selection information representing distribution information in a selectable manner. In this case, the personalization rules construction unit 13 constructs personalization rules including the selection condition indicating the action information representing the action of viewing the soccer content and the selection information indicating the advertisement information about soccer tickets.

Note that the personalization rules construction unit 13 may generate a selection condition based on information concerning a plurality of pieces of action information among a plurality of extracted pieces of action information. Furthermore, the personalization rules construction unit 13 may use information concerning a plurality of other pieces of action information among the plurality of extracted pieces of action information to generate selection information that indicates distribution information in a selectable manner.

The personalization rules transmission unit 14 transmits the personalization rules constructed by the personalization rules construction unit 13 to the information reception device 20. Note that the personalization rules transmission unit 14 may transmit all of personalization rules constructed by the personalization rules construction unit 13 to the information reception device 20 or may transmit some of the personalization rules.

The distribution information transmission unit 15 transmits distribution information stored in the distribution information storage unit 12 to the information reception device 20. Note that the distribution information transmission unit 15 may transmit all of the distribution information stored in the distribution information storage unit 12 to the information reception device 20 or may transmit some of the distribution information.

Details of the functional blocks of the information reception device 20 will be described next.

The personalization rules reception unit 21 receives personalization rules from the information distribution device 10. For example, the personalization rules reception unit 21 may include a personalization rules storage unit 211 implemented by a storage device and may store the received personalization rules in the personalization rules storage unit 211.

The distribution information reception unit 22 receives distribution information from the information distribution device 10. For example, the distribution information reception unit 22 may include a distribution information storage unit 221 implemented by a storage device and may store the received distribution information in the distribution information storage unit 221.

The action information acquisition unit 23 acquires action information representing actions of a user who uses the own device. For example, the action information acquisition unit 23 may acquire information concerning a history of browsing contents or advertisement information by using a content browsing unit (not depicted) included in the own device as action information of the user. Furthermore, the action information acquisition unit 23 may acquire action information from an action information storage unit 231 in which such action information is stored.

The distribution information filtering unit 24 selects distribution information from distribution information received by the distribution information reception unit 22 on the basis of personalization rules received by the personalization rules reception unit 21 and action information acquired by the action information acquisition unit 23. Specifically, the distribution information filtering unit 24 extracts personalization rules that include a selection condition that matches action information acquired by the action information acquisition unit 23 from among the personalization rules received by the personalization rules reception unit 21. The distribution information filtering unit 24 then selects a piece of distribution information indicated by the selection information included in the extracted personalization rules among the pieces of distribution information received by the distribution information reception unit 22.

An example will be described in which action information acquired by the action information acquisition unit 23 represents the action of viewing a soccer content. In this case, the distribution information filtering unit 24 extracts personalization rules that include information representing the action of viewing the soccer content from the personalization rules storage unit 211 as the selection condition. If the selection information included in the extracted personalization rules indicates advertisement information about soccer tickets, the distribution information filtering unit 24 selects distribution information representing soccer ticket advertisement information from the distribution information stored in the distribution information storage unit 221.

The distribution information presentation unit 25 outputs distribution information selected by the distribution information filtering unit 24 to a display device or the like.

An operation of the information distribution system 1 configured as described above will be described with reference to drawings.

Figure 3:
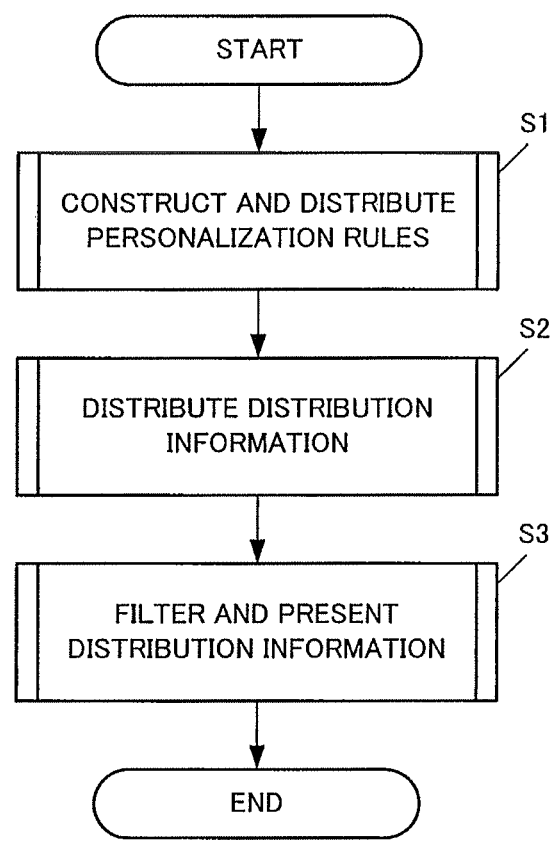
FIG. 3 is a flowchart illustrating an overview of an operation of the information distribution system according to the first exemplary embodiment of the present invention.

An overview of the operation of the information distribution system 1 is illustrated in FIG. 3.

In FIG. 3, first the information distribution device 10 constructs personalization rules on the basis of action information transmitted from the action information transmission device 30 and distributes the constructed personalization rules to the information reception device 20 (step S1).

The information distribution device 10 then distributes distribution information to the information reception device 20 (step S2).

Then the information reception device 20 applies the received personalization rules to action information indicating an action of the user of the own device to filter the received distribution information and presents the filtered information (step S3).

This is the end of the description of the overview of the operation of the information distribution system 1. Note that the information distribution system 1 does not necessarily need to execute steps S1 and S2 in this order. For example, step S1 may be executed after the execution of step S2 or may be executed in parallel with step S2. Furthermore, the information distribution system 1 may execute steps S1 and S2 at their respective predetermined timings. Alternatively, the information distribution system 1 may execute each of steps S1 and S2 when requested by the information reception device 20.

Figure 4:
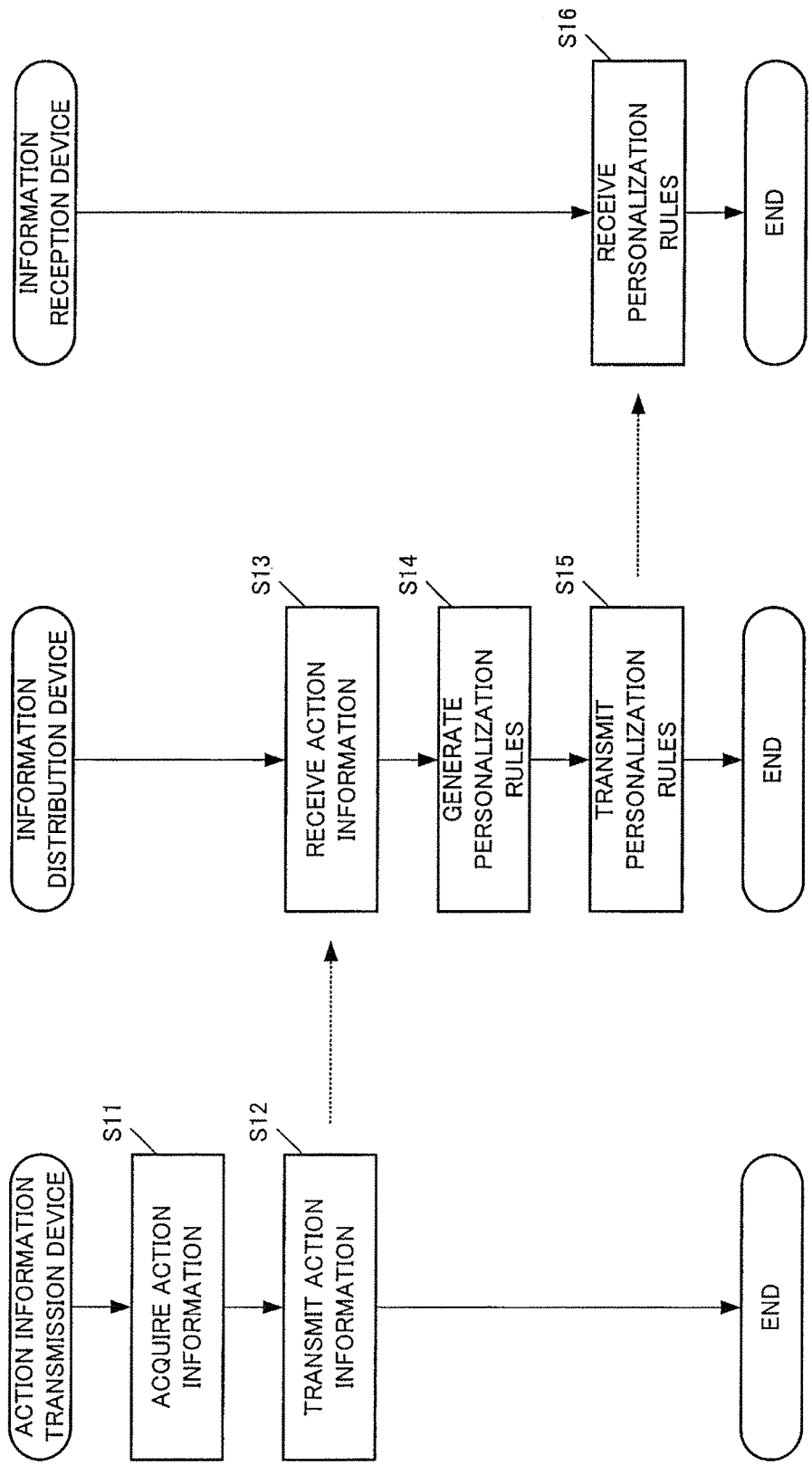
FIG. 4 is a flowchart illustrating a personalization rules construction and distribution operation in the information distribution system according to the first exemplary embodiment of the present invention.

FIG. 4 illustrates details of the personalization rules construction and distribution operation at step S1. Note that the left-hand part of FIG. 4 illustrates the operation of the action information transmission device 30, the middle part illustrates the operation of the information distribution device 10, the right-hand part illustrates the operation of the information reception device 20, and the dashed arrows that link the flows indicate flow of data.

In FIG. 4, first the action information acquisition unit 31 in the action information transmission device 30 acquires user's action information of the own device (step S11). For example, the action information acquisition unit 31 acquires action information from the action information storage unit 311 as noted previously.

Then the action information transmission unit 32 transmits the action information acquired at step S11 to the information distribution device 10 (step S12). For example, the action information transmission unit 32 may execute step S12 every time new action information is acquired at step S11. Alternatively, the action information transmission unit 32 may transmit action information stored in the action information storage unit 311 to the information distribution device 10 at timings such as predetermined intervals.

Then the action information collection unit 11 in the information distribution device 10 receives the action information transmitted from the action information transmission device 30 (step S13). The action information collection unit 11 stores the received action information in the action information storage unit 111, for example, as noted previously.

Then the personalization rules construction unit 13 extracts a plurality of related pieces of action information from the action information stored in the action information storage unit 111. The personalization rules construction unit 13 then generates personalization rules including a selection condition and selection information (step S14). The selection condition is based on information at least one of extracted pieces of action information and the selection information is information that uses information concerning at least another of the pieces of action information to indicate distribution information in a selectable manner. The personalization rules construction unit 13 stores the generated personalization rules in the personalization rules storage unit 131, for example, as noted previously.

Then the personalization rules transmission unit 14 transmits the personalization rules stored in the personalization rules storage unit 131 to the information reception device 20 (step S15). Note that the personalization rules transmission unit 14 may push the personalization rules to the information reception device 20 or may transmit the personalization rules in response to a pull request from the information reception device 20. The personalization rules transmission unit 14 may transmit all of the personalization rules stored in the personalization rules storage unit 131 to the information reception device 20 or may transmit some of the personalization rules, for example, as noted previously.

Then the personalization rules reception unit 21 in the information reception device 20 receives the personalization rules from the information distribution device 10 (step S16). For example, the personalization rules reception unit 21 stores the received personalization rules in the personalization rules storage unit 211, for example, as noted previously.

With this, the information distribution system 1 ends the personalization rules construction and distribution operation.

Figure 5:
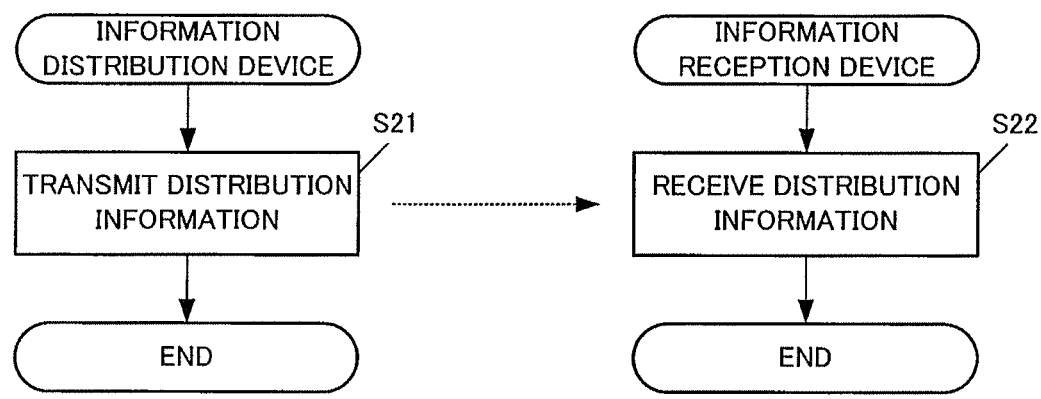
FIG. 5 is a flowchart illustrating a distribution information distribution operation in the information distribution system according to the first exemplary embodiment of the present invention.

FIG. 5 illustrates details of the distribution information distribution operation at step S2. Note that the left-hand part of FIG. 5 illustrates the operation of the information distribution device 10, the right-hand part illustrates the operation of the information reception device 20 and the dashed arrow that links the flows indicates a flow of data.

First, the distribution information transmission unit 15 in the information distribution device 10 transmits distribution information stored in the distribution information storage unit 12 to the information reception device 20 (step S21). Note that the distribution information transmission unit 15 may push the distribution information to the information reception device 20 or may transmit the distribution information in response to a pull request from the information reception device 20. Furthermore, the distribution information transmission unit 15 may transmit all of the distribution information stored in the distribution information storage unit 12 to the information reception device 20 or may transmit some of the distribution information, as noted previously.

Then the distribution information reception unit 22 in the information reception device 20 receives the distribution information from the information distribution device 10 (step S22). The distribution information reception unit 22 stores the received distribution information in the distribution information storage unit 221, for example, as noted previously.

With this, the information distribution system 1 ends the distribution information distribution operation.

Figure 6:
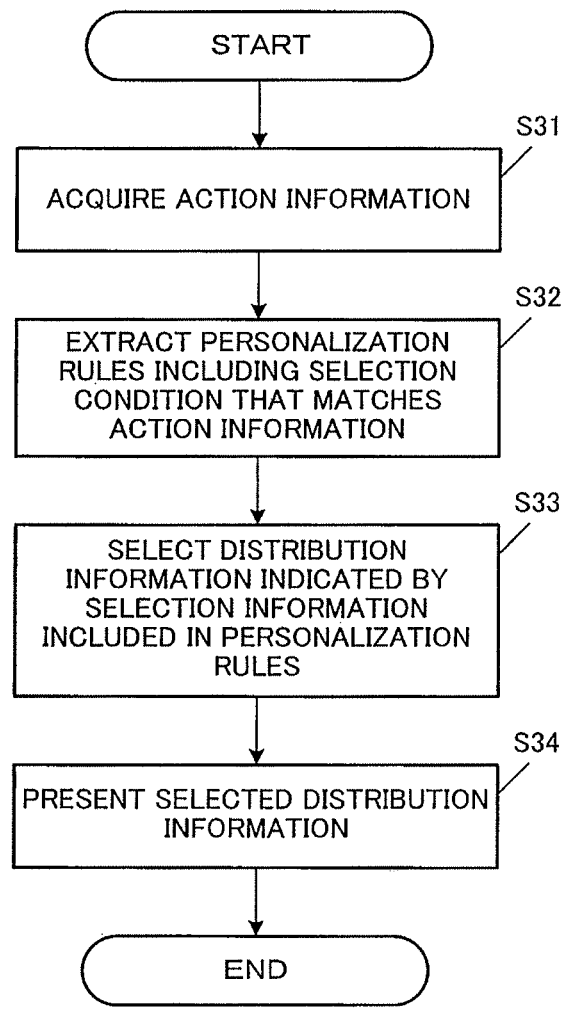
FIG. 6 is a flowchart illustrating a distribution information filtering and presentation operation in the information distribution system according to the first exemplary embodiment of the present invention.

FIG. 6 illustrates details of the distribution information filtering and presentation operation at step S3.

In FIG. 6, first the action information acquisition unit 23 of the information reception device 20 acquires action information of the user of the own device (step S31). For example, the action information acquisition unit 23 acquires action information from the action information storage unit 231 as noted previously.

Then the distribution information filtering unit 24 extracts personalization rules including a selection condition that matches the action information acquired by the action information acquisition unit 23 from among the personalization rules stored in the personalization rules storage unit 211 (step S32). If a plurality of pieces of action information are acquired at step S31, the distribution information filtering unit 24 may extract personalization rules including a selection condition that matches each of the pieces of action information. If there are a plurality of personalization rules that include a selection condition that matches one piece of action information, the distribution information filtering unit 24 may extract the plurality of personalization rules.

The distribution information filtering unit 24 then selects distribution information indicated by the selection information included in the personalization rules extracted at step S32 from among the pieces of distribution information stored in the distribution information storage unit 221 (step S33). If a plurality of personalization rules are extracted at step S32, the distribution information filtering unit 24 may select distribution information indicated by the selection information included in each of the personalization rules. Furthermore, if there are a plurality of pieces of distribution information indicated by the selection information of one personalization rule, the distribution information filtering unit 24 may select the plurality of pieces of distribution information.

Then the distribution information presentation unit 25 presents the distribution information selected at step S33 on a display device or the like (step S34).

With this, the information distribution system 1 ends the distribution information filtering and presentation operation.

Advantageous effects of the first exemplary embodiment of the present invention will be described below.

The information distribution system as the first exemplary embodiment of the present invention is capable of presenting distribution information that is more accurately suitable for a user to the user while protecting the user's privacy information.

This is because the components of the information distribution device perform the following operations. First, the action information collection unit of the information distribution device collects action information from the action information transmission device which transmits action information. Then the personalization rules construction unit extracts a plurality of related pieces of action information from the collected action information. The personalization rules construction unit constructs personalization rules including a selection condition based on information concerning at least one of the extracted pieces of action information and selection information that indicates distribution information in a selectable manner using at least another of the pieces of action information. Then the personalization rules transmission unit distributes the constructed personalization rules to the information reception device. The distribution information transmission unit distributes distribution information to the information reception device. This allows the components of the information reception device to perform the following operations. The distribution information filtering unit of the information reception device extracts personalization rules that include a selection condition that matches action information of the user of the own device from the distributed personalization rules. The distribution information filtering unit selects distribution information indicated by the selection information in the extracted personalization rules from among the distributed pieces of distribution information. Then the distribution information presentation unit presents the selected distribution information.

Thus, according to this exemplary embodiment, personalization rules used in selecting distribution information that matches user's action information from pieces of distribution information distributed beforehand in the information reception device can be generated with a higher level of accuracy. Consequently, this exemplary embodiment can present distribution information that is more accurately suitable for the user while protecting the user's privacy information.

(Second Exemplary Embodiment)

A second exemplary embodiment of the present invention will be described below in detail with reference to drawings. Throughout the drawings referred to in the description of this exemplary embodiment, the same components and the same operation steps as those of the first exemplary embodiment are given the same reference numerals and detailed description of those components and steps will be omitted from the description of this exemplary embodiment.

Figure 7:
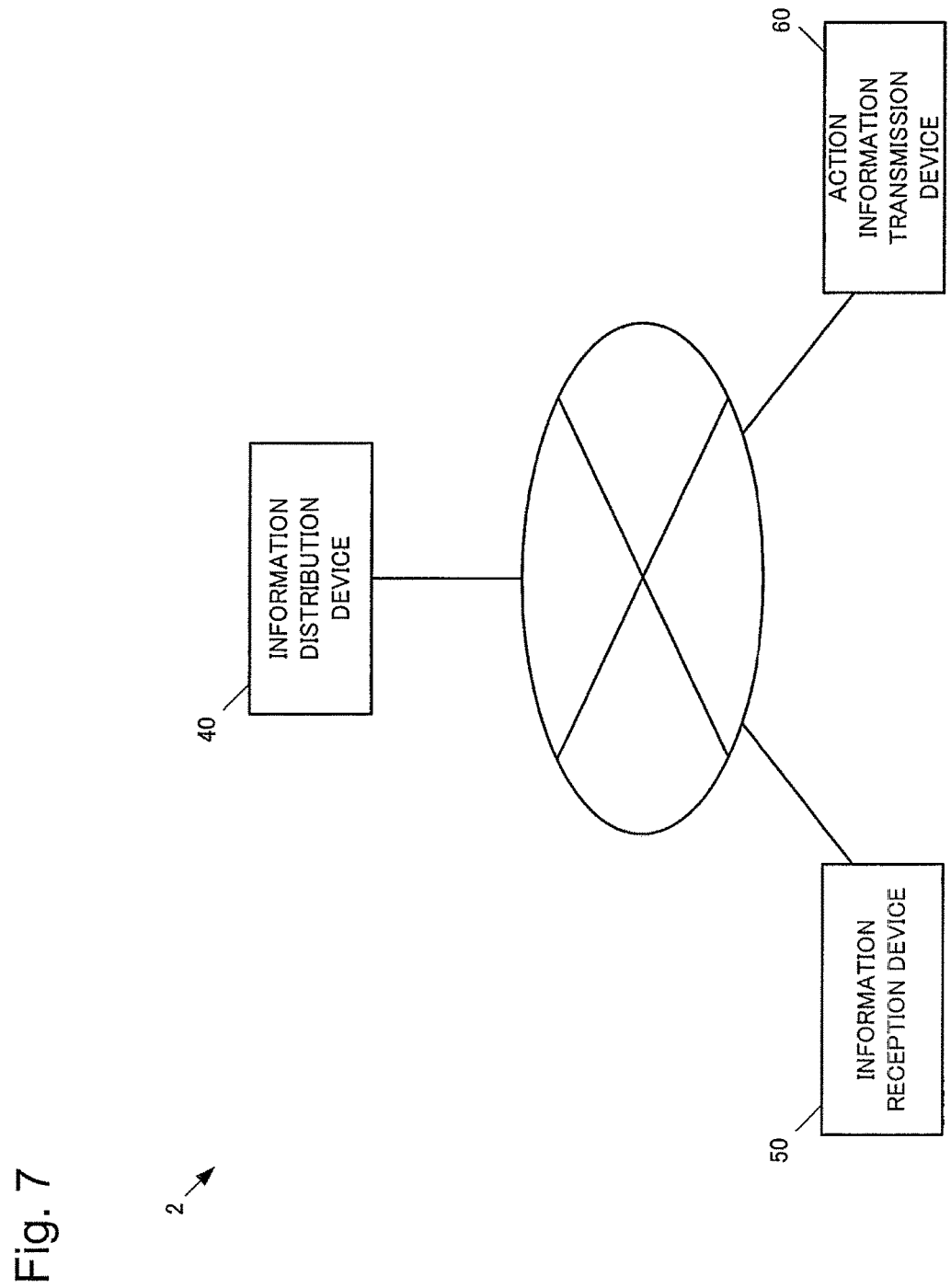
FIG. 7 is a block diagram illustrating a configuration of an information distribution system according to a second exemplary embodiment of the present invention.

FIG. 7 illustrates a configuration of an information distribution system 2 according to the second exemplary embodiment of the present invention. The information distribution system 2 in FIG. 7 differs from the information distribution system 1 according to the first exemplary embodiment of the present invention in the following way. The information distribution system 2 includes an information distribution device 40 in place of the information distribution device 10, an information reception device 50 in place of the information reception device 20, and an action information transmission device 60 in place of the action information transmission device 30.

Figure 8:
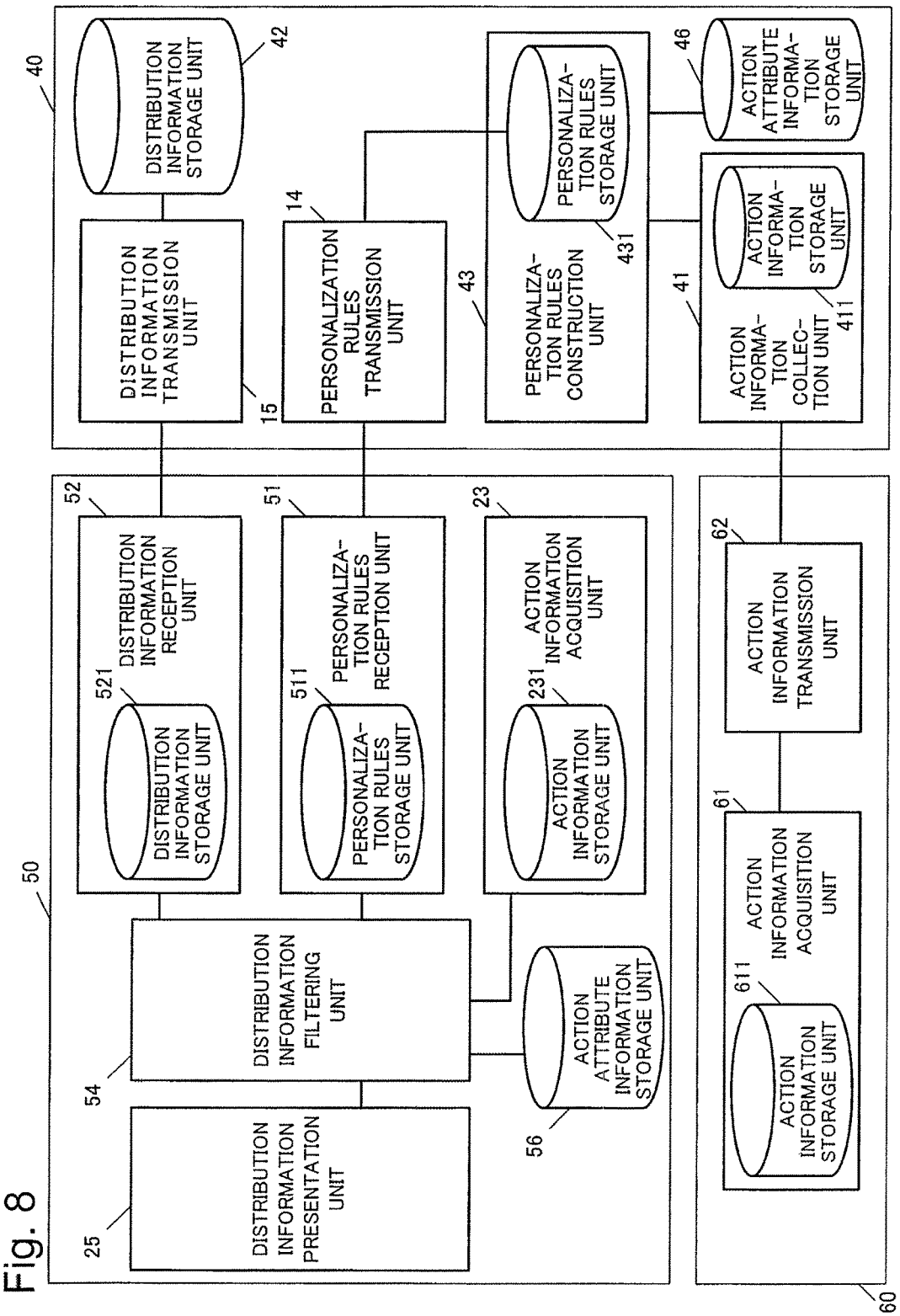
FIG. 8 is a functional block diagram illustrating functional configurations of devices making up of the information distribution system according to the second exemplary embodiment of the present invention.

FIG. 8 illustrates functional block configurations of the devices making up the information distribution system 2.

By contrast with the information distribution device 10 according to the first exemplary embodiment of the present invention, the information distribution device 40 in FIG. 8 includes an action information collection unit 41 in place of the action information collection unit 11 and a distribution information storage unit 42 in place of the distribution information storage unit 12. The information distribution device 40 further differs from the information distribution device 10 according to the first exemplary embodiment of the present invention in that the information distribution device 40 includes a personalization rules construction unit 43 in place of the personalization rules construction unit 13, and further includes an action attribute information storage unit 46. The action attribute information storage unit 46 can be implemented by a storage device of a computer device that forms the information distribution device 40.

In contrast with the information reception device 20 according to the first exemplary embodiment of the present invention, the information reception device 50 in FIG. 8 includes a personalization rules reception unit 51 in place of the personalization rules reception unit 21, and a distribution information reception unit 52 in place of the distribution information reception unit 22. The information reception device 50 further differs from the information reception device 20 according to the first exemplary embodiment of the present invention that the information reception unit 50 includes a distribution information filtering unit 54 in place of the distribution information filtering unit 24, and further includes an action attribute information storage unit 56. The action attribute information storage unit 56 can be implemented by a storage device of the computer device that forms the information reception device 50.

By contrast the action information transmission device 60 in FIG. 8 differs from the action information transmission device 30 according to the first exemplary embodiment of the present invention in that the action information transmission device 60 includes an action information acquisition unit 61 in place of the action information acquisition unit 31, and an action information transmission unit 62 in place of the action information transmission unit 32.

Details of the functional blocks of the information distribution system 2 will be described below.

Details of the functional blocks of the action information transmission device 60 will be described first.

The action information acquisition unit 61 acquires action information including information representing an action type. For example, the action information acquisition unit 61 may acquire action information from an action information storage unit 611 in which such action information is stored. An example of action information stored in the action information storage unit 611 is illustrated in FIG. 9. The rows in FIG. 9 indicate pieces of action information. In this example, the action information storage unit 611 stores action information including information representing the types of actions, information representing the times of the actions, and descriptions of the actions. Action information of the action type "viewing information" represents a user's action of viewing a content. For example, the action information in the first row indicates that the action type is "viewing information", the action was being performed in the time "10:00-11:00", and the description of the action is viewing on channel "3ch". In this example, the action information of the action type "response to advertisement" represents user's response to an advertisement. A response to an advertisement may be a click by the user on an area (a banner) on a screen in which the advertisement is displayed, for example. For example, the action information in the third row indicates that the action type is "response to advertisement", the action was performed at the time "11:30", and the content of the advertisement information as the description of the action is "soccer tickets".

The action information transmission unit 62 transmits identification information (a user ID (identifier)) of the user of the own device along with action information acquired by the action information acquisition unit 61 to the information distribution device 40. Note that the action information transmission unit 62 may use IDs stored beforehand in a storage unit of the own device as the user IDs or may use user IDs input through an input device.

Details of the functional blocks of the information distribution device 40 will be described below.

The action information collection unit 41 receives action information including information representing an action type and a user ID from the action information transmission device 60. The action information collection unit 41 includes an action information storage unit 411 implemented by a storage device and stores the received action information and user ID in the action information storage unit 411. An example of information stored in the action information storage unit 411 is illustrated in FIG. 10. The rows in FIG. 10 represents pieces of action information and user IDs associated with the pieces of action information.

The action attribute information storage unit 46 stores action attribute information representing an attribute of action information. The action attribute information storage unit 46 may store beforehand action attribute information for possible action information that may be collected by the action information collection unit 41. FIGS. 11A and 11B illustrate examples of information stored in the action attribute information storage unit 46. In the example in FIG. 11A, the rows indicate pieces of action attribute information for action information of the type "viewing information". For example, the third row in FIG. 11A indicates that action attribute information corresponding to action information representing that the user was viewing on channel 3 in the time 10:00-11:00 is "soccer program". The rows in the example in FIG. 11B indicate action attribute information corresponding to action information of the type "response to advertisement". For example, the first row in FIG. 11B represents that action attribute information corresponding to action information representing that the user responded to advertisement information about soccer tickets is "soccer information".

The distribution information storage unit 42 stores distribution information including distribution attribute information. The distribution attribute information is information representing an attribute of distribution information. An example of distribution information stored in the distribution information storage unit 42 is illustrated in FIG. 12. The rows in FIG. 12 represent pieces of distribution information. For example, the distribution information in the first row in FIG. 12 represents that the content of the distribution information is an advertisement of "soccer ticket" and distribution attribute information is "soccer information".

The personalization rules construction unit 43 acquires action attribute information corresponding to action information collected by the action information collection unit 41 from the action attribute information storage unit 46 to extract pieces of action attribute information for a plurality of related pieces of action information. The personalization rules construction unit 43 then generates a selection condition including at least one of the extracted pieces of action attribute information. The personalization rules construction unit 43 includes at least another of the plurality of extracted pieces of action attribute information in selection information to generate selection information that indicates distribution information having the distribution attribute information corresponding to the action attribute information in a selectable manner. The personalization rules construction unit 43 then constructs personalization rules including the selection condition and the selection information thus generated. For example, if there is action attribute information that takes the same attribute value as an attribute value that distribution attribute information can take, selection information including the action attribute information represents distribution information that has the distribution attribute information that takes the same attribute value as the action attribute information in a selectable manner. For example, the selection information including the action attribute information "soccer information" in the example described above represents "soccer tickets", for example, as one of pieces of distribution information that has the corresponding distribution attribute information "soccer information".

Furthermore, the personalization rules construction unit 43 may extract action attribute information for a plurality of related pieces of action information as follows. Specifically, the personalization rules construction unit 43 extracts action attribute information of a predetermined first type action information and action attribute information of a predetermined second type action information that are related to each other. Action attribute information of the predetermined first type action information will be hereinafter also referred to as the first type action attribute information; action attribute information of the predetermined second type action information will be hereinafter also referred to as the second type action attribute information. The personalization rules construction unit 43 constructs personalization rules that include the extracted first type action attribute information as a selection condition and include the extracted second type action attribute information as selection information.

The personalization rules construction unit 43 may generate a combination of the first type action attribute information and the second type action attribute information for each piece of user identification information and, for each combination, may sum up the number of the pieces of user identification information for which the combination is generated. The number of such pieces of user identification information will be hereinafter also referred to as the number of users. The personalization rules construction unit 43 may construct personalization rules on the basis of a combination extracted on the basis of the result of the summing-up.

Figure 13:
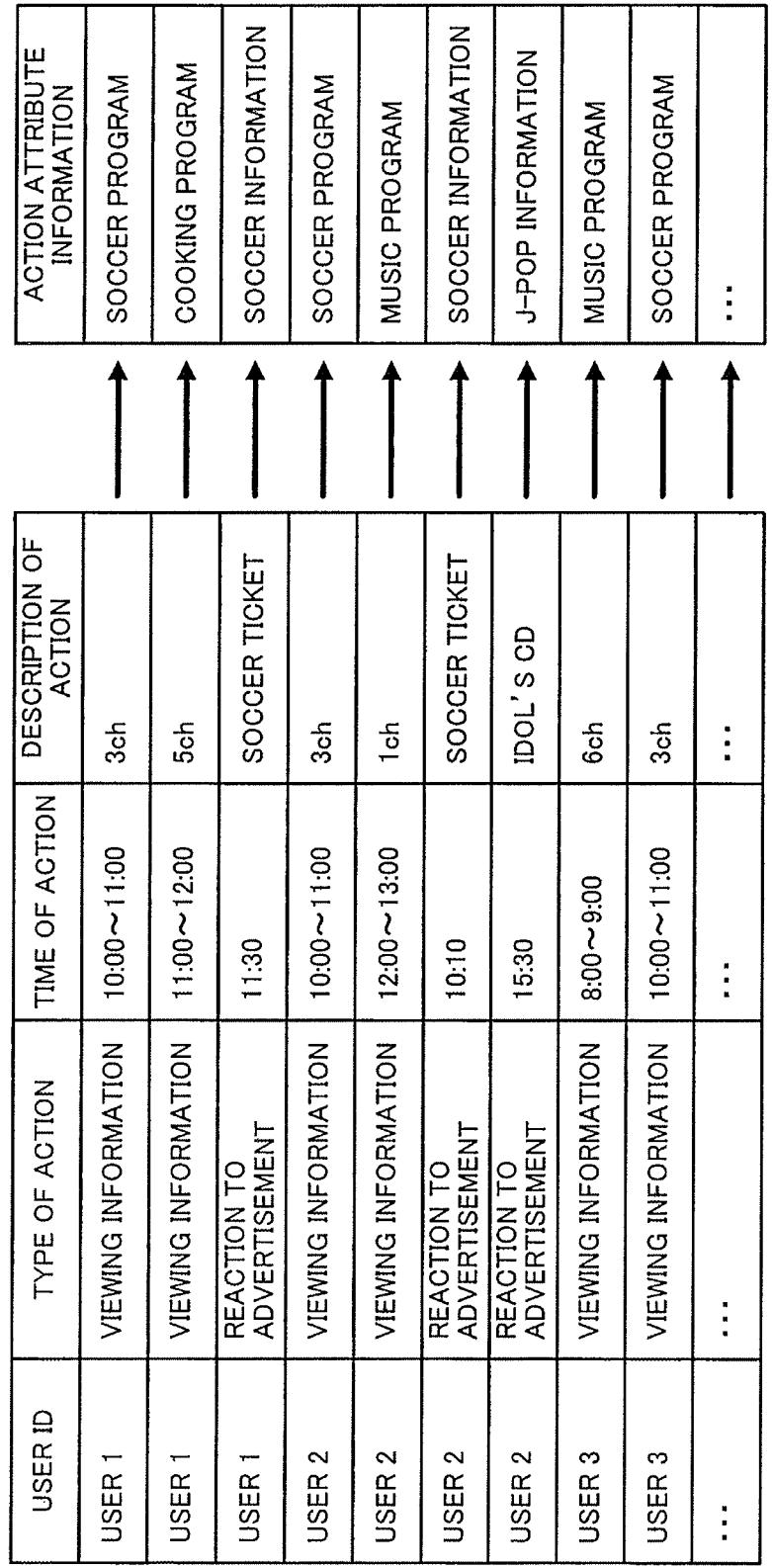
FIG. 13 is a diagram illustrating an example of action attribute information corresponding to action information stored in the action information storage unit of the information distribution device in the information distribution system according to the second exemplary embodiment of the present invention.

For example, assume that action information collected by the action information collection unit 41 is stored in the action information storage unit 411 as illustrated in FIG. 10. In this case, the personalization rules construction unit 43 acquires pieces of action attribute information corresponding to the piece of action information in FIG. 10 from the action attribute information storage unit 46 illustrated as an example in FIG. 11. As a result, action attribute information for each piece of action information can be obtained as illustrated in FIG. 13.

Assume for example that "viewing information" is set as the first type and the action information type "response to advertisement" which has action attribute information that can take the same value as the distribution attribute information of distribution information is set as the second type. In this case, the personalization rules construction unit 43 generates a combination of action attribute information of the first type "viewing information" and action attribute information of the second type "response to advertisement" for each piece of user identification information and sums up the number of users for whom the same combination is generated. For example, in the example in FIG. 13, the personalization rules construction unit 43 counts the number of users for the combination of the action attribute information "soccer program" of the first type "viewing information" and the action attribute information "soccer information" of the second type "response to advertisement". The personalization rules construction unit 43 counts the number of users for the combination of pieces of information of "User 1" and "User 2". The combination of the action attribute information "soccer program" of the first type "viewing information" and the action attribute information "soccer information" of the second type "response to advertisement" will be hereinafter also denoted as ("soccer program", "soccer information"). In this way, the personalization rules construction unit 43 sums up the number of users for combinations of the first type action attribute information and the second type action attribute information and arranges the combinations in descending order of the number of users to obtain the result of the summing-up as illustrated in FIG. 14. The exemplary result of the summing-up indicates, for example, that the number of users, 1134, is counted for the combination of the first type action attribute information and the second type action attribute information ("soccer program", "soccer information").

In this case, the personalization rules construction unit 43 constructs personalization rules based on combinations extracted on the basis of the result of the summing-up. For example, the personalization rules construction unit 43 may extract a predetermined number of combinations in descending order of the number of users from the result of the summing-up illustrated in FIG. 14. The personalization rules construction unit 43 may then construct personalization rules including a selection condition including action attribute information of the first type "viewing information" and selection information including action attribute information of the second type "response to advertisement" for each of the extracted combinations.

Details of the functional blocks of the information reception device 50 will be described below.

The action attribute information storage unit 56 stores action attribute information which represents attributes of action information. The action attribute information storage unit 56 stores beforehand action attribute information representing attributes of possible action information that may be acquired by the action information acquisition unit 23. Note that the action attribute information stored in the action attribute information storage unit 56 may be the same as the information stored in the action attribute information storage unit 46 of the information distribution device 40. For example, the action attribute information storage unit 56 may receive such action attribute information from the information distribution device 40 and store the action attribute information. Alternatively, the action attribute information storage unit 56 may store action attribute information distributed from an external device. In that case, the action attribute information storage unit 46 of the information distribution device 40 stores the action attribute information distributed from the external device.

The personalization rules reception unit 51 receives personalization rules which include a selection condition including action attribute information and selection information including action attribute information corresponding to distribution attribute information from the information distribution device 40. The personalization rules reception unit 51 includes a personalization rules storage unit 511 implemented by a storage device and stores the received personalization rules in the personalization rules storage unit 511.

The distribution information reception unit 52 receives distribution information including distribution attribute information from the information distribution device 40. The distribution information reception unit 52 includes a distribution information storage unit 521 implemented by a storage device and stores the received distribution information in the distribution information storage unit 521.

The distribution information filtering unit 54 extracts personalization rules that include a selection condition that matches action attribute information of action information acquired by the action information acquisition unit 23 from among the personalization rules stored in the personalization rules storage unit 511. The distribution information filtering unit 54 may refer to the action attribute information storage unit 56 to acquire action attribute information of action information acquired by the action information acquisition unit 23.

Furthermore, the distribution information filtering unit 54 may sum up the frequencies of occurrence of action information acquired by the action information acquisition unit 23 and may extract personalization rules from the personalization rules storage unit 511. The personalization rules include a selection condition that matches action information selected on the basis of the result of the summing-up. For example, the distribution information filtering unit 54 may sum up the frequencies of occurrence of action attribute information corresponding to action information acquired by the action information acquisition unit 23. As a result of the summing-up, a frequency of occurrence of 52 for "soccer program" and a frequency of occurrence of 14 for "cooking program", for example, are obtained. In this case, for each of a predetermined number of action attribute information in descending order of the summed frequencies of occurrence, the distribution information filtering unit 54 may extract personalization rules including the piece of action attribute information as the selection condition.

Furthermore, the distribution information filtering unit 54 selects distribution information that has distribution attribute information corresponding to action attribute information included in the selection information in personalization rules extracted as described above from the distribution information stored in the distribution information storage unit 521.

An operation of the information distribution system 2 configured as described above will be described with reference to drawings. The outline of the operation of the information distribution system 2 is the same as that of the information distribution system 1 illustrated in FIG. 3 as the first exemplary embodiment and therefore the description of the outline will be omitted from the description of the second exemplary embodiment.

Figure 15:
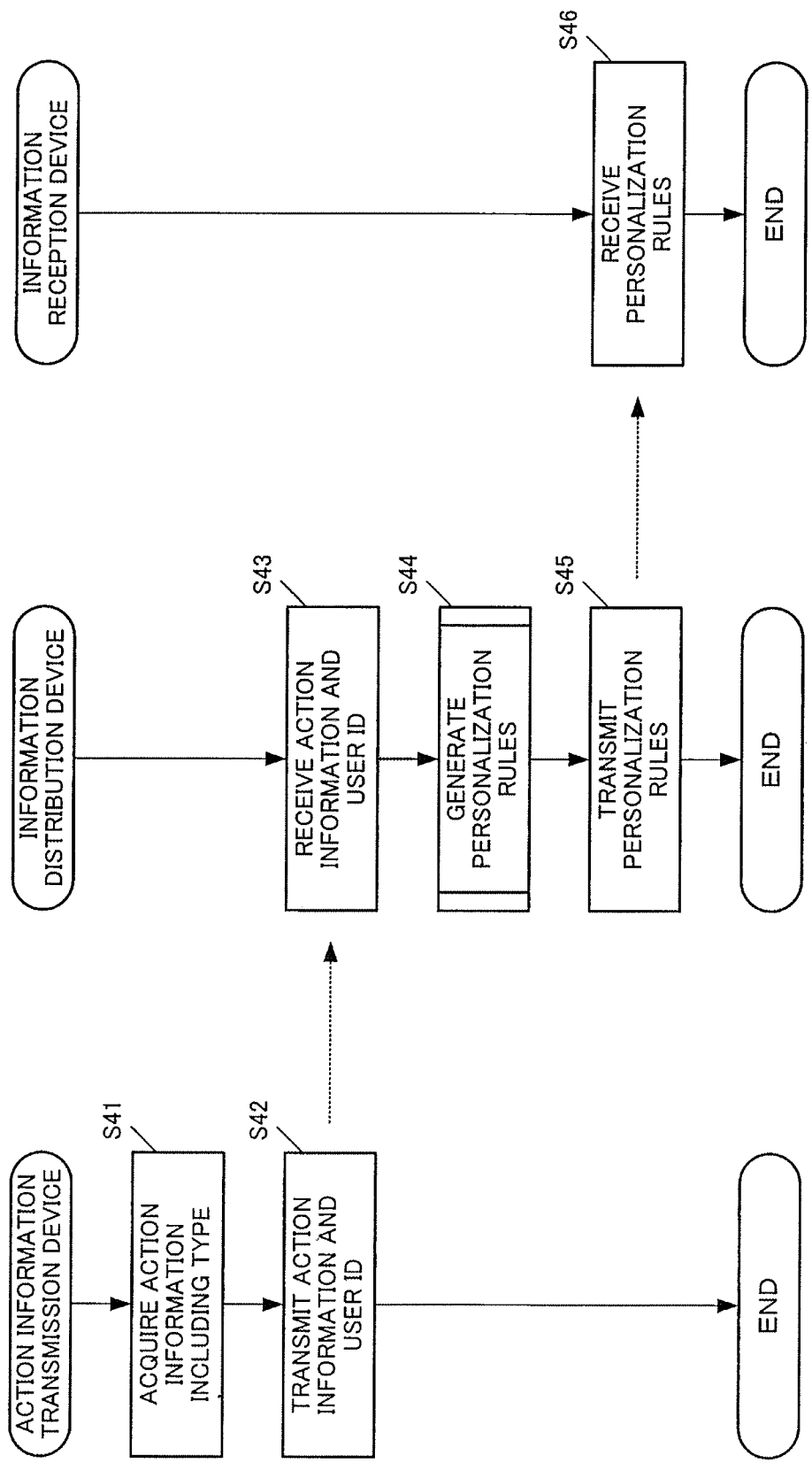
FIG. 15 is a flowchart illustrating a personalization rules construction and distribution operation in the information distribution system according to the second exemplary embodiment of the present invention.

FIG. 15 illustrates a personalization rules construction and distribution operation of the information distribution system 2. The left-hand part of FIG. 15 illustrates the operation of the action information transmission device 60, the middle part illustrates the operation of the information distribution device 40, the right-hand part illustrates the operation of the information reception device 50, and the dashed arrows that link the flows indicate data flows.

In FIG. 15, first the action information acquisition unit 61 in the action information transmission device 60 acquires action information including information representing an action type as action information of the user of the own device (step S41). For example, the action information acquisition unit 61 acquires action information from the action information storage unit 611 in which such action information is stored, as noted previously.

Then the action information transmission unit 62 transmits the action information acquired at step S41 and the user ID of the own device to the information distribution device 40 (step S42). The action information transmission unit 62 may execute step S42 every time a new piece of action information is added to the action information storage unit 611. Alternatively, the action information acquisition unit 61 may transmit action information stored in the action information storage unit 611 to the information distribution device 40 at timings such as predetermined intervals.

Then the action information collection unit 41 in the information distribution device 40 receives the action information and the user ID transmitted from the action information transmission device 60 (step S43) and stores the action information and the user ID in the action information storage unit 411. The action information includes information indicating an action type.

Then the personalization rules construction unit 43 extracts a combination of pieces of action attribute information for a plurality of related pieces of action information on the basis of the action information stored in the action information storage unit 411. The personalization rules construction unit 43 then generates personalization rules on the basis of the extracted combination (step S44) and stores the personalization rules in the personalization rules storage unit 431. The step will be described in detail later.

Then the personalization rules transmission unit 14 transmits personalization rules stored in the personalization rules storage unit 431 to the information reception device 50 (step S45). As noted previously, the personalization rules transmission unit 14 may transmit all of the personalization rules stored in the personalization rules storage unit 431 or some of the personalization rules. Furthermore, as in the first exemplary embodiment, the personalization rules transmission unit 14 may push the personalization rules to the information reception device 50 or may transmit the personalization rules in response to a pull request from the information reception device 50.

Then the personalization rules reception unit 51 of the information reception device 50 receives the personalization rules and stores the personalization rules in the personalization rules storage unit 511 (step S46).

With this, the information distribution system 2 ends the personalization rules construction and distribution operation.

Figure 16:
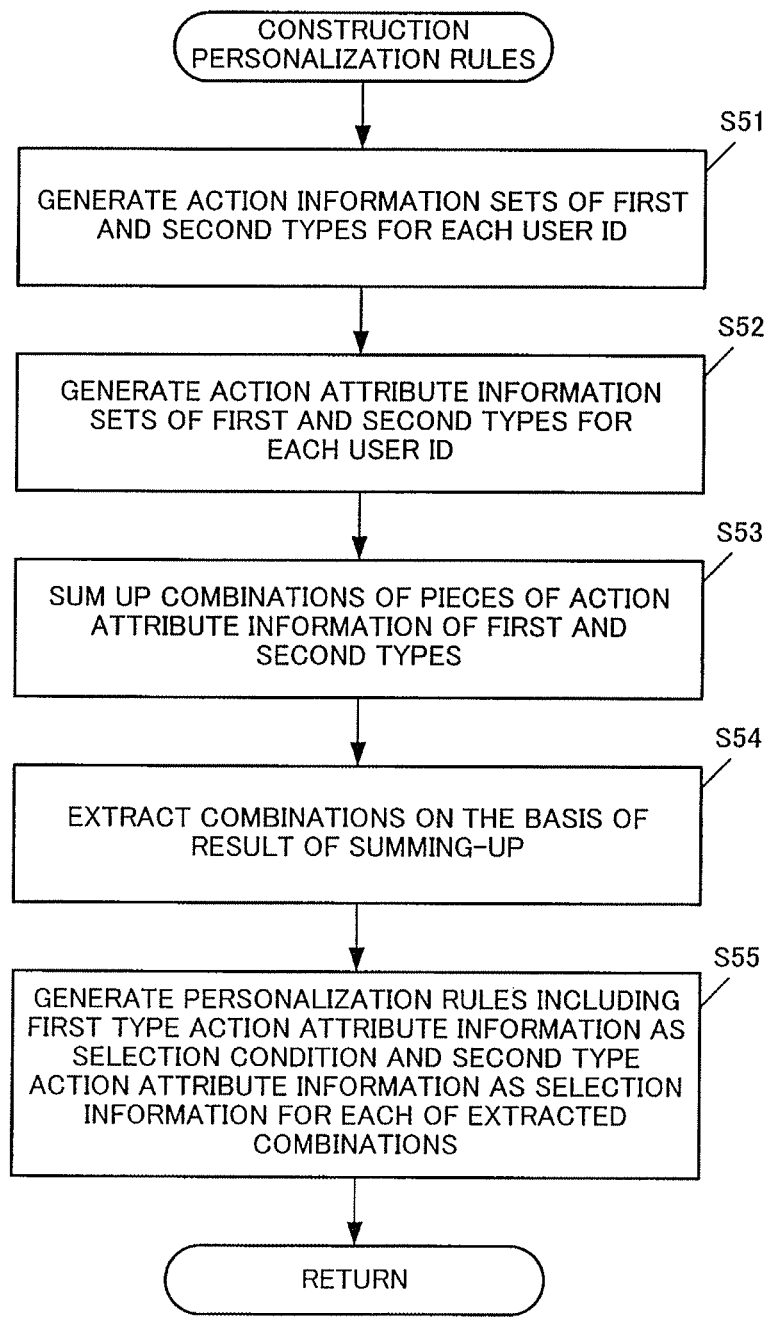
FIG. 16 is a flowchart illustrating details of the personalization rules construction operation in the information distribution system according to the second exemplary embodiment of the present invention.

FIG. 16 illustrates an example of details of the personalization rules generation operation at step S44. Referring to FIG. 16, an exemplary operation performed by the personalization rules construction unit 43 to sum up combinations of the first type action attribute information and the second type action attribute information and construct personalization rules based on a combination extracted on the basis of the result of the summing-up will be described.

In FIG. 16, the personalization rules construction unit 43 first generates a set of the action information (action information set) of first type and a set of the action information of second type for each user ID of the action information stored in the action information storage unit 411 (step S51).

The personalization rules construction unit 43 then refers to the action information attribute storage unit 46 to acquire action attribute information corresponding to each element of the first action information set and each element of the second action information set generated at step S51 for each user ID. The personalization rules construction unit 43 then generates a set of the first action attribute information (action attribute information set) and a set of second action attribute information set for each user ID (step S52).

The personalization rules construction unit 43 then generates combinations of the elements of the first action attribute information set and the elements of the second action attribute information set generated at step S52 for each user ID. For each combination, the personalization rules construction unit 43 then sums up the number of users for which the same combination is generated (step S53).

The personalization rules construction unit 43 then extracts combinations of the first action attribute information and second action attribute information on the basis of the result of the summing-up at step S53 (step S54). For example, the personalization rules construction unit 43 may extract a predetermined number of combinations in descending order of the number of users.

Then, for each of the combinations extracted at step S54, the personalization rules construction unit 43 constructs personalization rules including the first type action attribute information as a selection condition and the second type action attribute information as selection information (step S55). Note that it is assumed here that a type of action information that has action attribute information that corresponds to distribution attribute information is determined as the second type.

This is the end of the detailed description of the personalization rules generation operation at step S44.

A distribution information distribution operation of the information distribution system 2 will be described next. The distribution information distribution operation of the information distribution system 2 is the same as the distribution information distribution operation of the information distribution system 1 of the first exemplary embodiment of the present invention described with reference to FIG. 5. However, distribution information distributed in this exemplary embodiment includes distribution attribute information.

Figure 17:
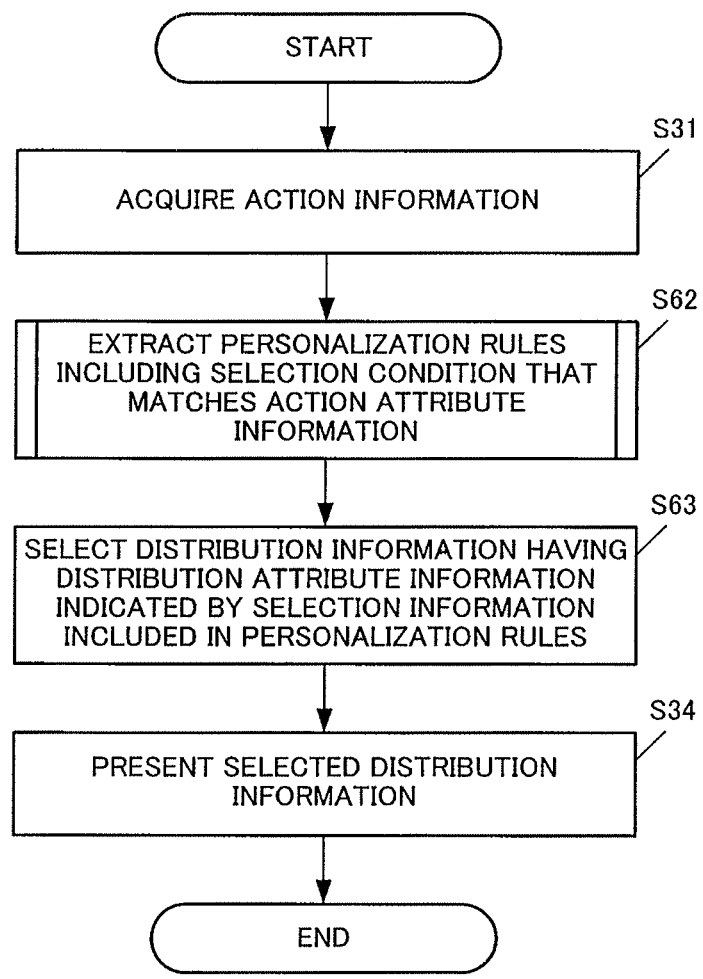
FIG. 17 is a flowchart illustrating a distribution information filtering and presentation operation in the information distribution system according to the second exemplary embodiment of the present invention.

FIG. 17 illustrates a distribution information filtering and presentation operation of the information distribution system 2.

In FIG. 17, first the action information acquisition unit 23 of the information reception device 50 executes step S31 to acquire action information of the user of the own device as in the first exemplary embodiment of the present invention.

Then the distribution information filtering unit 54 extracts personalization rules including a selection condition that matches the action attribute information of the action information acquired at step S31 from among the personalization rules stored in the personalization rules storage unit 511 (step S62). This step will be described in detail later.

The distribution information filtering unit 54 then selects distribution information having distribution attribute information that corresponds to action attribute information included in the selection information in the personalization rules extracted at step S62 from the distribution information stored in the distribution information storage unit 521 (step S63).

Then the distribution information presentation unit 25 executes step S34 to present the distribution information selected at step S63 on a display device or the like as in the first exemplary embodiment of the present invention.

With this, the information distribution system 2 ends the distribution information filtering and presentation operation.

Figure 18:
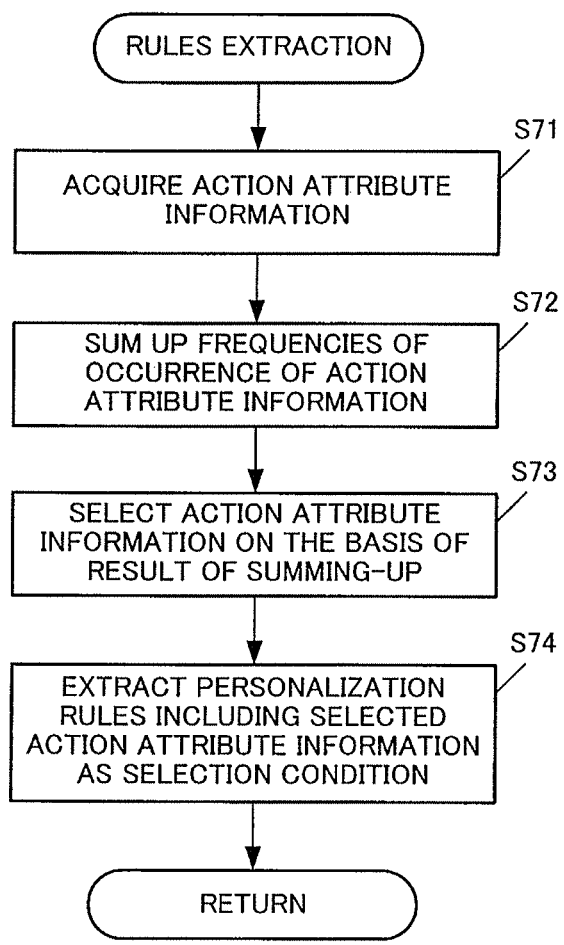
FIG. 18 is a flowchart illustrating details of the operation of extracting personalization rules in the distribution information filtering operation in the information distribution system according to the second exemplary embodiment of the present invention.

FIG. 18 illustrates details of the personalization rules extraction operation at step S62.

In FIG. 18, first the distribution information filtering unit 54 acquires action attribute information that corresponds to the action information acquired at step S31 from the action attribute information storage unit 56 (step S71).

For the pieces of action attribute information acquired at step S71, the distribution information filtering unit 54 then sums up the number of pieces of action information (the frequency of occurrence) that are acquired at step S31 and have the same piece of action attribute information (step S72).

The distribution information filtering unit 54 then selects action attribute information on the basis of the result of the summing-up at step S72 (step S73). For example, the distribution information filtering unit 54 may select a predetermined number of pieces of action attribute information in descending order of the frequency of occurrence, as noted previously.

Then, for each piece of action attribute information selected at step S73, the distribution information filtering unit 54 extracts personalization rules that include the action attribute information as a selection information from the personalization rules storage unit 511 (step S74).

This is the end of the description of the personalization rules extraction operation at step S62.

A specific example of operation of the information distribution system 2 will be described next.

A specific example of the personalization rules construction operation of the information distribution system 2 will be described first.

First, the action information acquisition unit 61 in the action information transmission device 60 acquires action information including information representing action types as illustrated in FIG. 9 as action information of the user of the own device (step S41 of FIG. 15).

The action information transmission unit 62 then transmits the action information illustrated in FIG. 9 and information representing "User 1" as the user ID to the information distribution device 40 (step S42).

Then, the action information collection unit 41 in the information distribution device 40 receives the action information and the user ID from the action information transmission device 60. The action information collection unit 41 stores the received action information and user ID in the action information storage unit 411 in association with each other (step S43). As a result, information as illustrated in FIG. 10 is stored in the action information storage unit 411.

Then the personalization rules construction unit 43 constructs personalization rules on the basis of the information in the action information storage unit 411 illustrated in FIG. 10 (step S44).

Specifically, the personalization rules construction unit 43 first generates an action information set of the first type and an action information set of the second type for each user ID on the basis of the information in the action information storage unit 411 illustrated in FIG. 10. It is assumed here that "viewing information" is set as the first type and "response to advertisement" is set as the second type. In this case, the personalization rules construction unit 43 generates a set, {("10:00-11:00", 3ch), ("11:00-12:00", 5ch)}, as the action information set of the first type "viewing information" for "user 1". Furthermore, the personalization rules construction unit 43 generates a set, {("11:30", "soccer ticket")}, as the action information set of the second type "response to advertisement" for "user 1". Similarly, the personalization rules construction unit 43 generates action information sets of the first type and action information sets of the second type for other user IDs (step S51 of FIG. 16).

Then the personalization rules construction unit 43 refers to the action information attribute storage unit 46 illustrated in FIG. 11 to acquire pieces of action attribute information that correspond to the elements of the action information set of the first type and the elements of the action information set of the second type for each user ID generated at step S51. The personalization rules construction unit 43 then generates an action attribute information set of the first type and an action attribute information set of the second type for each user ID. For example, the personalization rules construction unit 43 generates a set, {"soccer program", "cooking program"}, as the action attribute information set of the first type "viewing information" for "user 1". Furthermore, the personalization rules construction unit 43 generates a set, {"soccer information"}, as the action attribute information set of the second type "response to advertisement" for "user 1". Similarly, the personalization rules construction unit 43 generates action attribute information sets of the first type and action attribute information sets of the second type for other user IDs (step S52).

The personalization rules construction unit 43 then generates combinations of the elements of the action attribute information set of the first type and the elements of the action attribute information set of the second type for each user ID generated at step S52. For example, the personalization rules construction unit 43 generates a combination, ("soccer program", "soccer information"), of the first type action attribute information "soccer program" and the second type action attribute information "soccer information" for "user 1". Similarly, the personalization rules construction unit 43 generates another combination of the first type action attribute information and the second type action attribute information for "user 1". Furthermore, the personalization rules construction unit 43 generates combinations of pieces of first type action attribute information and pieces of second type action attribute information for other user IDs. Then, for each of the combinations, the personalization rules construction unit 43 then sums up the number of users for which the same combination is generated. For example, the personalization rules construction unit 43 counts the number of users for which the combination ("soccer program", "soccer information") is generated. Similarly, the personalization rules construction unit 43 counts the number of users for the other combinations (step S53). It is assumed that the result of the summing-up illustrated in FIG. 14 is obtained.

The personalization rules construction unit 43 then extracts top five combinations of pieces of the first type action attribute information and pieces of second type action attribute information in terms of the number of users from the result of the summing-up at step S53 (step S54). In this example, combinations ("soccer program", "soccer information"), ("music program", "J-POP information"), ("children's program", "toy information"), ("children's program", "golf information), and ("soccer program", "game information") are extracted from the results of the summing-up in FIG. 14.

Then, for each of the combinations extracted at step S54, the personalization rules construction unit 43 constructs personalization rules including the first type action attribute information as a selection condition and the second type action attribute information as selection information. For example, the personalization rules construction unit 43 generates personalization rules, "selection condition"="soccer program", "selection information"="soccer information", on the basis of the combination ("soccer program", "soccer information"). Similarly, the personalization rules construction unit 43 generates personalization rules on the basis of the other combinations extracted at step S54 (step S55).

The personalization rules construction unit 43 then stores the generated personalization rules in the personalization rules storage unit 431. It is assumed that as a result, personalization rules illustrated in FIG. 19 are stored in the personalization rules storage unit 431.

Then the personalization rules transmission unit 14 of the information distribution device 40 transmits the personalization rules stored in the personalization rules storage unit 431 to the information reception device 50 (step S45 of FIG. 15).

The personalization rules reception unit 51 of the information reception device 50 receives the personalization rules and stores the personalization rules in the personalization rules storage unit 511 (step S46). It is assumed here that all of the personalization rules illustrated in FIG. 19 are distributed and stored in the personalization rules storage unit 511 of the information reception device 50.

Then the distribution information transmission unit 15 of the information distribution device 40 transmits distribution information stored in the distribution information storage unit 42 to the information reception device 50. The distribution information reception unit 52 of the information reception device 50 receives the distribution information and stores the distribution information in the distribution information storage unit 521 (steps S21 and S22 of FIG. 5). It is assumed here that all of the distribution information illustrated in FIG. 12 are distributed and stored in the distribution information storage unit 521 of the information reception device 50.

Then the action information acquisition unit 23 of the information reception device 50 filters the distributed distribution information on the basis of the distributed personalization rules and action information on the own device.

Specifically, it is assumed that first the action information acquisition unit 23 is acquired action information illustrated in FIG. 20 from the action information storage unit 231 (step S31 of FIG. 17).

Then the distribution information filtering unit 54 extracts personalization rules including a selection condition that matches action attribute information of the action information acquired at step S31 from the personalization rules storage unit 511 (step S62).

Specifically, first the distribution information filtering unit 54 acquires action attribute information corresponding to the action information illustrated in FIG. 20 from the action information attribute information storage unit 56 illustrated in FIG. 11 (step S71 of FIG. 18). As a result, action attribute information illustrated in FIG. 21 is obtained.

Figure 21:
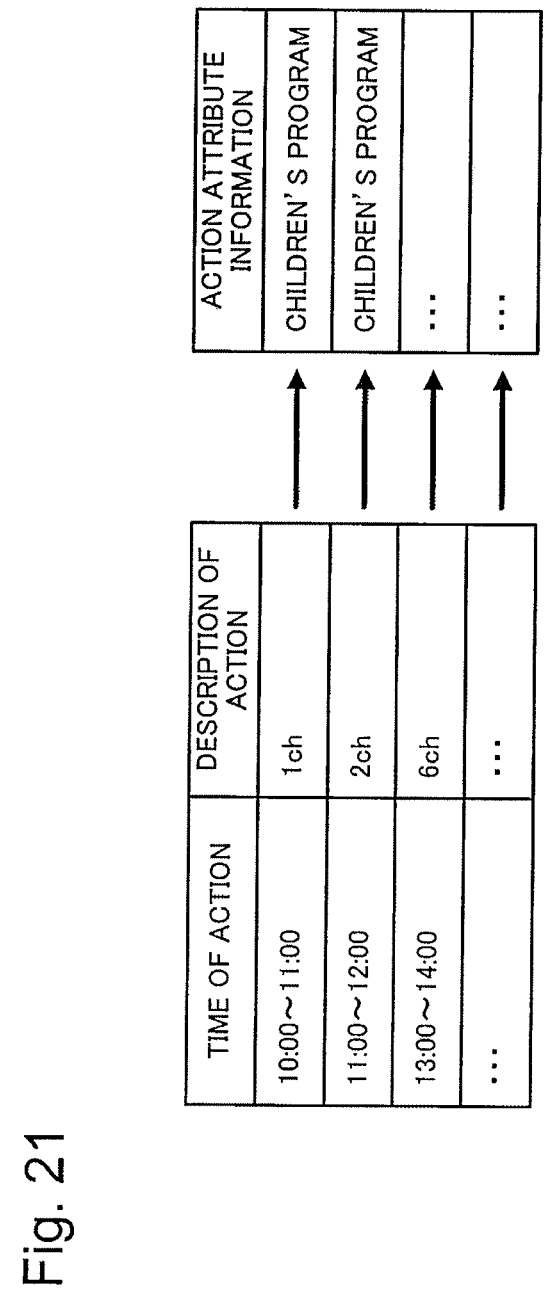
FIG. 21 is a diagram illustrating an example of action attribute information corresponding to action information acquired by the action information acquisition unit of the information reception device according to the second exemplary embodiment of the present invention.

Then, for the action attribute information illustrated in FIG. 21, the distribution information filtering unit 54 sums up the number (the frequencies of occurrence) of pieces of the action information that are acquired at step S31 and have the same action attribute information. It is assumed here that the result of the summing-up illustrated in FIG. 22 is obtained. The distribution information filtering unit 54 selects a predetermined number of top pieces of action attribute information from the results of the summing-up (step S73). It is assumed here that the top three pieces of action attribute information, "children's program", "quiz show" and "comedy program", are selected from the result of the summing-up in FIG. 22.

For each of the pieces of action attribute information selected at step S73, the distribution information filtering unit 54 then extracts personalization rules that include the piece of action attribute information as a selection condition from the personalization rules storage unit 511 (step S74). Two personalization rules, {"selection condition"="children's program", "selection information"="toy information"} and {"selection condition"="children's program", "selection information"="golf information"}, are extracted here.

The distribution information filtering unit 54 then selects distribution information that has distribution attribute information corresponding to action attribute information included in the selection information in the personalization rules extracted at step S62 from the distribution information storage unit 521 illustrated in FIG. 12 (step S63 of FIG. 17). As a result, three pieces of distribution information, "portable game machine", "card game" and "golf wear" are selected.

Then the distribution information presentation unit 25 presents the three pieces of distribution information selected at step S63 on a display device or the like (step S34). For example, the distribution information presentation unit 25 may include the selected pieces of distribution information in a content program list displayed on a display device by a content viewer application running on a computer device that forms the information reception device 50 as illustrated in FIG. 23.

This is the end of the description of the specific operation of the information distribution system 2.

Advantageous effects of the second exemplary embodiment of the present invention will be described below.

The information distribution system as the second exemplary embodiment of the present invention is capable of distributing distribution information that is more accurately suitable for a user while protecting the user's privacy information.

The reasons are as follows. The action information storage unit in the information distribution device stores action attribute information that corresponds to action information and the distribution information storage unit stores distribution information that includes distribution attribute information beforehand. The action information collection unit collects action information including information representing action types from the action information transmission device which transmits action information. The personalization rules construction unit extracts a combination of action attribute information of the first type action information and action attribute information of the second type action information from action attribute information that corresponds to the collected action information. The personalization rules construction unit then constructs personalization rules including the first type action attribute information as a selection condition and the second type action attribute information as selection information out of the extracted combination. Then the personalization rules transmission unit of the information distribution device distributes the constructed personalization rules to the information reception device and the distribution information transmission unit distributes distribution information including the distribution attribute information to the information reception device. In the information reception device, the action attribute information storage unit stores action attribute information corresponding to action information. The distribution information filtering unit in the information reception device acquires action information of the user of the own device and refers to the action attribute information storage unit to acquire the action attribute information. Furthermore, the distribution information filtering unit extracts personalization rules that include a selection condition that matches the acquired action attribute information from the received personalization rules. Then the distribution information filtering unit selects distribution information that has distribution attribute information corresponding to the action attribute information included in the selection information in the extracted personalization rules from the received pieces of distribution information. Then the distribution information presentation unit presents the selected distribution information.

Thus, personalization rules used in selecting distribution information that matches action information of the user from pieces of distribution information distributed beforehand in the information reception device can be more accurately constructed on the basis of relevance of action attribute information.

The action information collection unit of the information distribution device in this exemplary embodiment has been described as receiving a user ID along with action information and storing the action information and the user ID in the action information storage unit in association with each other. In another example, the action information collection unit may store identification information of the action information transmission device 60 that is transmitted the collected action information as the user ID, in association with the collected action information.

Furthermore, this exemplary embodiment has been described primarily with an example in which the selection information in personalization rules includes the second type action attribute information to represent distribution information that has distribution attribute information that takes the same value as the second type action attribute information in a selectable manner. In another example, the selection information in personalization rules may represent, in a selectable manner, distribution information that has distribution attribute information represented by character strings including a character string representing action attribute information included in the selection information. In this way, the selection information in personalization rules in this exemplary embodiment may be any selection information that represents, in a selectable manner, distribution information having distribution attribute information indicated by the action attribute information included in the selection information.

(Third Exemplary Embodiment)

A third exemplary embodiment of the present invention will be described in detail below with reference to drawings. Throughout the drawings referred to in the description of this exemplary embodiment, the same components and the same steps as those of the second exemplary embodiment of the present invention are given the same reference numerals and detailed description of those component and steps will be omitted from the description of this exemplary embodiment.

Figure 24:
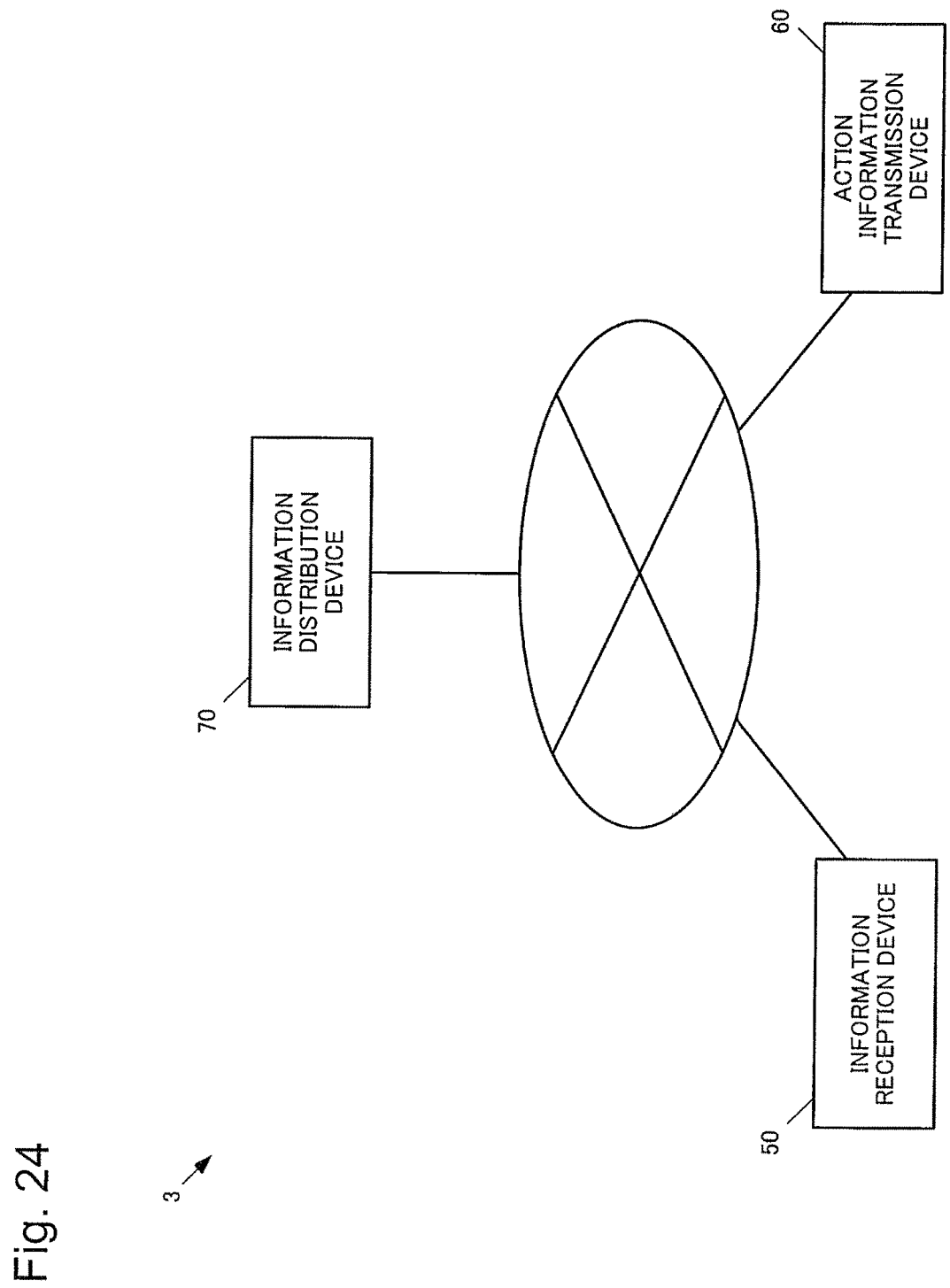
FIG. 24 is a block diagram illustrating a configuration of an information distribution system according to a third exemplary embodiment of the present invention.

FIG. 24 illustrates a configuration of an information distribution system 3 according to the third exemplary embodiment of the present invention. The information distribution system 3 in FIG. 24 differs from the information distribution system 2 according to the second exemplary embodiment of the present invention in that the information distribution system 3 includes an information distribution device 70 in place of the information distribution device 40.

Figure 25:
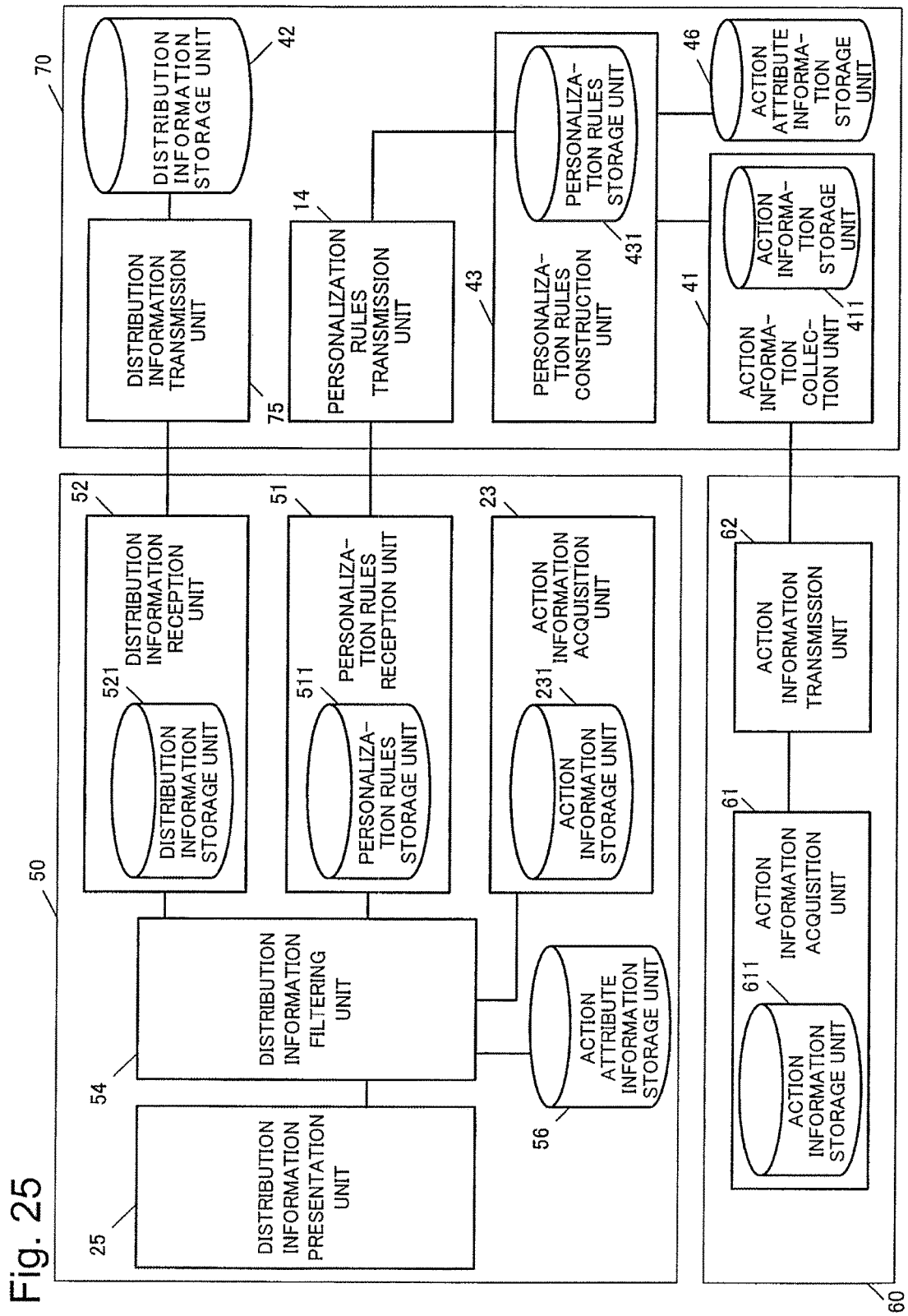
FIG. 25 is a functional block diagram illustrating functional configurations of devices making up the information distribution system according to the third exemplary embodiment of the present invention.

FIG. 25 illustrates functional block configurations of the devices making up the information distribution system 3.

In FIG. 25, the information distribution device 70 differs from the information distribution device 40 according to the second exemplary embodiment of the present invention in that the information distribution device 70 includes a distribution information transmission unit 75 in place of the distribution information transmission unit 15.

The distribution information transmission unit 75 selects distribution information to be transmitted to an information reception device 50 from a distribution information storage unit 42 as follows.

For example, the distribution information transmission unit 75 selects distribution information to be transmitted to the information reception device 50 from the information in the distribution information storage unit 42 on the basis of action frequency information of action information. Action frequency information of action information is information that represents the frequencies with which the action indicated by the action information is taken by users. The action frequency information may be frequencies measured in a past predetermined time period. Typical action frequency information is the audience rating for content viewing actions. For example, the distribution information transmission unit 75 may sum up the number of pieces of action information collected by the action information collection unit 41 in a past predetermined time period to acquire the action frequency information. Alternatively, the distribution information transmission unit 75 may acquire action frequency information from an external device that provides such action frequency information. Furthermore, the distribution information transmission unit 75 may acquire action frequency information associated with a season, a day of the week, a particular date or the like as the action frequency information.

Specifically, the distribution information transmission unit 75 may select distribution information from the information in the distribution information storage unit 42 on the basis of action frequency information of action information that can match the selection condition in personalization rules transmitted by a personalization rules transmission unit 14 to the information reception device 50. The distribution information selected from the information in the distribution information storage unit 42 is distribution information that can be selected through the selection information included in the personalization rules. For example, the distribution information transmission unit 75 may identify a predetermined number of top personalization rules in terms of action frequency information of action information that has action attribute information included in the selection condition among personalization rules transmitted to the information reception device 50. Note that the personalization rules transmitted to the information reception device 50 are personalization rules that are transmitted by the personalization rules transmission unit 14. The distribution information transmission unit 75 may select distribution information that has distribution attribute information corresponding to action attribute information included in the selection information in the identified personalization rules from the information in the distribution information storage unit 42.

The distribution information transmission unit 75 may select the same distribution information that can be selected in accordance with each of a plurality of personalization rules that have different selection conditions from the information in the distribution information storage unit 42 as distribution information to transmit to the information reception device 50. Specifically, the distribution information transmission unit 75 may identify personalization rules that have different selection conditions and the same selection information among the personalization rules transmitted by the personalization rules transmission unit 14 to the information reception device 50. Then the distribution information transmission unit 75 may select distribution information that has distribution attribute information corresponding to action attribute information included in the selection information in the identified personalization rules from the information in the distribution information storage unit 42.

The distribution information transmission unit 75 transmits the distribution information selected from the information in the distribution information storage unit 42 as described above to the information reception device 50.

An operation of the information distribution system 3 configured as described above will be described. The operation of the information distribution system 3 is substantially the same as the operation of the information distribution system 2 of the second exemplary embodiment of the present invention described with reference to FIGS. 3, 5 and 15 to 18, except details of the operation at step S21 of FIG. 5.

Figure 26:
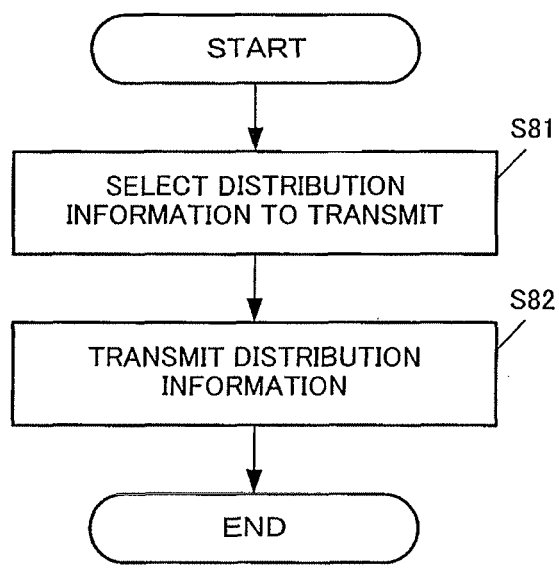
FIG. 26 is a flowchart illustrating a distribution information distribution operation of the information distribution system according to the third exemplary embodiment of the present invention.

FIG. 26 illustrates details of the distribution information distribution operation at step S21.

In FIG. 26, first the distribution information transmission unit 75 selects distribution information from the information in the distribution information storage unit 42 (step S81). For example, the distribution information transmission unit 75 may select distribution information that can be selected in accordance with personalization rules identified on the basis of action frequency information of action information as noted above. Alternatively, the distribution information transmission unit 75 may select the same distribution information that can be selected in accordance with personalization rules including different selectin conditions.

The distribution information transmission unit 75 then transmits the distribution information selected at step S81 to the information reception device 50 (step S82).

This is the end of the detailed description of the distribution information transmission operation at step S21.

Advantageous effects of the third exemplary embodiment of the present invention will be described below.

The information distribution system as the third exemplary embodiment of the present invention is capable of reducing the amount of distribution information distributed to a user while maintaining the rate of browsing of the distribution information when presenting the distribution information that is more accurately suitable for the user while protecting the user's privacy information.

The reasons are as follows. The distribution information transmission unit acquires action frequency information of action information and selects distribution information that can be selected in accordance with personalization rules on the basis of action frequency information of action information that matches selection conditions in the personalization rules. The distribution information transmission unit then transmits the selected distribution information to the information reception device. Consequently, the distribution information that can be selected in accordance with personalization rules that match action information that will occur with a high frequency is stored in the distribution information storage unit of the information reception device. In other words, it can be said that distribution information that is not distributed from the information distribution device to the information reception device in this exemplary embodiment is distribution information that is not likely to be selected by filtering on the information reception device even if the distribution information is distributed. Accordingly, this exemplary embodiment can maintain the browsing rate of distribution information from the information distribution device while reducing the amount of distribution information to reduce the network load and the load on the information reception device as compared with distributing all distribution information from the information distribution device to the information reception device.

Furthermore, when the information distribution system as the third exemplary embodiment of the present invention presents distribution information that is accurately suitable for a user who does not provide action information, the information distribution system can prevent leakage of the user's privacy information.

This is because the distribution information transmission unit selects the same distribution information that can be selected in accordance with personalization rules including different selection conditions and transmits the distribution information to the information reception device. Information representing response of the user to the distribution information, such as browsing the presented distribution information on the information reception device or purchasing merchandise as a result of browsing the distribution information, is transmitted to a server that provides the browsed information or a server that sells the merchandise. In other words, the information representing the response of the user to the presented distribution information may be transmitted to the outside. If the presented distribution information and the selection condition used by the distribution information filtering unit when selecting the distribution information were in one-to-one correspondence in personalization rules, the user's action information that has caused the distribution information to be selected would leak out to the outside. In this exemplary embodiment, user's action information that causes the distribution to be selected does not leak to the outside even through information representing the response of the user to the distribution information is transmitted to the outside, because the same distribution information that can be selected in accordance with personalization rules that include different selection conditions is selected and transmitted to the information reception device.

While the exemplary embodiments of the present invention have been described primarily by taking action information that represents content viewing actions and response to advertisements as an example, the present invention is also applicable to action information that represents other actions of users.

The devices making up the information distribution system in any of the exemplary embodiments of the present invention described above may be implemented by the functional blocks distributed among a plurality of computer devices.

Furthermore, the information reception device and the action information transmission device in any of the exemplary embodiments of the present invention may be implemented by the same computer device.

In any of the exemplary embodiments of the present invention described above, the operation of each of the devices described with reference to the flowcharts may be stored in a storage device (recording medium) of a computer device as a computer program of the present invention. The computer program may be read and executed by the CPU. In that case, the present invention is constituted by the code of the computer program or the recording medium.

Furthermore, any of the exemplary embodiments described above can be combined as appropriate.

Moreover, the present invention is not limited to the exemplary embodiments described above and can be implemented in various modes.

Any or all of the exemplary embodiments described above can be described as in the following supplementary notes, but not limited thereto.

(Supplementary Note 1)

An information distribution device including:

an action information collection unit which collects action information from an action information transmission device transmitting action information representing an action of a user;

a distribution information storage unit which stores distribution information distributed to an information reception device;

a personalization rules construction unit which extracts a plurality of related pieces of action information from the action information collected by the action information collection unit, generates a selection condition based on information concerning at least one of the plurality of extracted pieces of action information, and generates, by using information concerning at least another of the plurality of extracted pieces of action information, selection information representing the distribution information in a selectable manner to construct personalization rules including the generated selection condition and the generated selection information;

a personalization rules transmission unit which transmits the personalization rules constructed by the personalization rules construction unit to the information reception device; and a distribution information transmission unit which transmits distribution information stored in the distribution information storage unit to the information reception device.

(Supplementary Note 2)

The information distribution device according to Supplementary Note 1, further including an action attribute information storage unit which stores action attribute information representing an attribute of the action information, wherein the distribution information storage unit stores distribution information including distribution attribute information representing an attribute of the distribution information as the distribution information; and the personalization rules construction unit extracts action attribute information of a plurality of related pieces of action information by acquiring action attribute information corresponding to the action information collected by the action information collection unit from the action attribute information storage unit, generates the selection condition including at least one of the plurality of extracted pieces of action attribute information, and includes at least another of the extracted plurality of action attribute information in the selection information to generate the selection information representing distribution information having distribution attribute information corresponding to the action attribute information in a selectable manner.

(Supplementary Note 3)

The information distribution device according to Supplementary Note 1 or 2, wherein the action information collection unit receives action information including information representing the type of the action information as the action information; and the personalization rules construction unit extracts a predetermined first type of action information and a predetermined second type of action information that are related to each other from the action information collected by the action information collection unit, generates the selection condition on the basis of information concerning the extracted first type of action information, and uses information concerning the extracted second type of action information to generate the selection information so that the selection information represents the distribution information in a selectable manner.

(Supplementary Note 4)

The information distribution device according to Supplementary Note 3, wherein when a type of action information having action attribute information corresponding to the distribution attribute information is predetermined as the second type, the personalization rules construction unit extracts a related combination out of combinations of action attribute information of the first type of action information and action attribute information of the second type of action information on the basis of the action information collected by the action information collection unit, and constructs the personalization rules including action attribute information of the first type of action information indicated by the extracted combination as the selection condition and action attribute information of the second type of action information indicated by the combination as selection information.

(Supplementary Note 5)

The information distribution device according to Supplementary Note 4, wherein the action information collection unit collects user identification information identifying a user of the action information transmission device along with the action information; and the personalization rules construction unit generates a combination of action attribute information of the first type of action information and action attribute information of the second type of action information for each piece of user identification information, sums up the number of pieces of user identification information for which the same combination is generated, and constructs the personalization rules on the basis of a combination extracted on the basis of the result of the summing-up.

(Supplementary Note 6)

The information distribution device according to any one of Supplementary Notes 1 to 5, wherein the distribution information transmission unit acquires action frequency information representing the frequency of occurrence of the action indicated by the action information to select, from the distribution information storage unit, distribution information selectable through selection information included in personalization rules transmitted by the personalization rules transmission unit to the information reception device on the basis of action frequency information of action information that can match a selection condition in the personalization rules, and transmits the selected distribution information to the information reception device.

(Supplementary Note 7)

The information distribution device according to any one of Supplementary Notes 1 to 6, wherein the distribution information transmission unit selects, from the distribution information storage unit, the same distribution information selectable according to a plurality of personalization rules including different selection conditions among personalization rules transmitted by the personalization rules transmission unit to the information reception device, and transmits the selected distribution information to the information reception device.

(Supplementary Note 8)

An information reception device including:

a personalization rules reception unit which receives the personalization rules from the information distribution device according to any one of Supplementary Notes 1 to 7;

a distribution information reception unit which receives the distribution information from the information distribution device;

an action information acquisition unit which acquires action information representing an action of a user who uses the own device;

a distribution information filtering unit which extracts personalization rules including a selection condition that matches action information acquired by the action information acquisition unit from among personalization rules received by the personalization rules reception unit and selects distribution information indicated by selection information included in the extracted personalization rules from distribution information received by the distribution information reception unit; and a distribution information presentation unit which outputs the distribution information selected by the distribution information filtering unit.

(Supplementary Note 9)

The information reception device according to Supplementary Note 8, further including an action attribute information storage unit which stores action attribute information representing an attribute of the action information, wherein the distribution information reception unit receives, as the distribution information, distribution information including distribution attribute information representing an attribute of the distribution information;

the personalization rules reception unit receives personalization rules which include a selection condition including the action attribute information and selection information including action attribute information corresponding to the distribution attribute information; and the distribution information filtering unit acquires, from the action attribute information storage unit, action attribute information of action information acquired by the action information acquisition unit to extract personalization rules including a selection condition that matches action attribute information of action information acquired by the action information acquisition unit from among the personalization rules received by the personalization rules reception unit, and selects distribution information having distribution attribute information corresponding to action attribute information included in selection information in the extracted personalization rules from the distribution information received by the distribution information reception unit.

(Supplementary Note 10)

The information reception device according to Supplementary Note 8 or 9, wherein the distribution information filtering unit sums up the frequencies of occurrence of pieces of action information acquired by the action information acquisition unit and extracts personalization rules including a selection condition that matches action information selected on the basis of a result of the summing-up.

(Supplementary Note 11)

An action information transmission device including:

an action information acquisition unit which acquires action information representing an action of a user who uses the own device; and an action information transmission unit which transmits the action information to the information distribution device according to any one of Supplementary Notes 1 to 7.

(Supplementary Note 12)

An information distribution system including:

the information distribution device according to any one of Supplementary Notes 1 to 7;

the information reception device according to any one of Supplementary Notes 8 to 10; and the action information transmission device according to Supplementary Note 11.

(Supplementary Note 13)

An information distribution method in an information distribution system including an information distribution device, an information reception device and an action information transmission device, wherein the action information transmission device acquires action information representing an action of a user who uses the own device, and transmits the action information to the information distribution device;

the information distribution device stores distribution information in a distribution information storage unit included in the information distribution device, collects action information from the action information transmission device, extracts a plurality of related pieces of action information from the collected action information, generates a selection condition based on information concerning at least one of the plurality of extracted pieces of action information, and generates, by using information concerning at least another of the plurality of extracted pieces of action information, selection information representing the distribution information in a selectable manner to construct personalization rules including the generated selection condition and the generated selection information, transmits the constructed personalization rules to the information reception device, and transmits distribution information stored in the distribution information storage unit included in the information distribution device to the information reception device; and the information reception device receives the personalization rules from the information distribution device, receives the distribution information from the information distribution device, acquires action information representing an action of a user who uses the own device, extracts personalization rules including a selection condition that matches the acquired action information from among received personalization rules, selects distribution information indicated by selection information included in the extracted personalization rules from received distribution information, and outputs the selected distribution information.

(Supplementary Note 14)

An information distribution method including:

collecting action information from an action information transmission device transmitting action information representing an action of a user;

storing distribution information in a distribution information storage unit;

extracting a plurality of related pieces of action information from the collected action information, generating a selection condition based on information concerning at least one of the plurality of extracted pieces of action information, and generating, by using information concerning at least another of the plurality of extracted pieces of action information, selection information representing the distribution information in a selectable manner to construct personalization rules including the generated selection condition and the generated selection information;

transmitting the constructed personalization rules to an information reception device; and transmitting distribution information stored in the distribution information storage unit to the information reception device.

(Supplementary Note 15)

An information reception method including:

receiving the personalization rules from an information distribution device executing the information distribution method according to Supplementary Note 14;

receiving the distribution information from the information distribution device;

acquiring action information representing an action of a user who uses the own device;

extracting personalization rules including a selection condition that matches the acquired action information from among received personalization rules and selecting distribution information indicated by selection information included in the extracted personalization rules from the received distribution information; and outputting the selected distribution information.

(Supplementary Note 16)

An action information transmission method including:

acquiring action information representing an action of a user who uses the own device; and transmitting the action information to an information distribution device executing the information distribution method according to Supplementary Note 14.

(Supplementary Note 17)

A computer program causing a computer device to use a distribution information storage unit storing distribution information to execute:

an action information collection step of collecting action information from an action information transmission device transmitting action information representing an action of a user;

a personalization rules construction step of extracting a plurality of related pieces of action information from the action information collected at the action information collection step, generating a selection condition based on information concerning at least one of the plurality of extracted pieces of action information, generating, by using information concerning at least another of the plurality of extracted pieces of action information, selection information representing the distribution information in a selectable manner to construct personalization rules including the generated selection condition and the generated selection information;

a personalization rules transmission step of transmitting the personalization rules constructed at the personalization rules construction step to the information reception device; and a distribution information transmission step of transmitting distribution information stored in the distribution information storage unit to the information reception device.

(Supplementary Note 18)

A computer program causing a computer device to execute:

a personalization rules reception step of receiving the personalization rules from an information distribution device executing the computer program according to Supplementary Note 17;

a distribution information reception step of receiving the distribution information from the information distribution device;

an action information acquisition step of acquiring action information representing an action of a user who uses the own device;

a distribution information filtering step of extracting personalization rules including a selection condition that matches the action information acquired at the action information acquisition step from among personalization rules received at the personalization rules reception step, and selecting distribution information indicated by selection information included in the extracted personalization rules from the distribution information received at the distribution information reception step; and a distribution information presentation step of outputting the distribution information selected at the distribution information filtering step.

(Supplementary Note 19)

A computer program causing a computer device to execute:

an action information acquisition step of acquiring action information representing an action of a user who uses the own device; and an action information transmission step of transmitting the action information to an information distribution device executing the computer program according to Supplementary Note 17.

This application is based upon and claims the benefit of priority from Japanese Patent Application No. 2012-277013, filed on Dec. 19, 2012, the entire disclosure of which is incorporated herein.

REFERENCE SIGNS LIST 1, 2, 3 Information distribution system
10, 40, 70 Information distribution device
11, 41 Action information collection unit
12, 42, 221, 521 Distribution information storage unit
13, 43 Personalization rules construction unit
14 Personalization rules transmission unit
15, 75 Distribution information transmission unit
46, 56 Action attribute information storage unit
111, 231, 311, 411, 611 Action information storage unit
131, 211, 431, 511 Personalization rules storage unit
20, 50 Information reception device
21, 51 Personalization rules reception unit
22, 52 Distribution information reception unit
23, 31, 61 Action information acquisition unit
24, 54 Distribution information filtering unit
25 Distribution information presentation unit
30, 60 Action information transmission device
32, 62 Action information transmission unit

The invention claimed is:
1. An information reception device comprising:
a memory storing instructions; and
one or more processors to execute the instructions to:
receive, from an information distribution device, a plurality of pieces of distribution information representing advertisements;
receive, from the information distribution device, a plurality of personalization rules, each of the plurality of personalization rules including a selection condition and selection information, wherein
the selection condition is generated based on information concerning at least one of a plurality of pieces of action information, which are extracted from actions of a user who uses the user's own device, and
the selection information represents one of the plurality of received pieces of distribution information and is generated by using information concerning at least another one of the plurality of extracted pieces of action information;
acquire a piece of action information;
extract, from the plurality of received personalization rules, personalization rules based on a corresponding selection condition that matches the acquired piece of action information and select, from the plurality of received pieces of distribution information, a piece of distribution information indicated by selection information included in the extracted personalization rules; and
output the selected piece of distribution information, wherein the one or more processors execute the instructions to:
associate, for each of a plurality of user identifications and from a plurality of pieces of action information from the plurality of user identifications, first type of action attribute information with second type of action attribute information to form a pair,
count a number of each unique pair of first type of action attribute information together with second type of action attribute information for all of the plurality of user identifications, and
rank the counted numbers of unique pairs to form at least a personalized rule including, as a combination of selection condition and selection information, a pair of first type of action attribute information together with second type of action attribute information.

2. The information reception device according to claim 1, the one or more processors to execute the instructions to:
store, for each of the plurality of pieces of action information, action attribute information representing an attribute of the action information;
receive, for each of the plurality of pieces of distribution information, distribution attribute information representing an attribute of the distribution information;
receive, for each of the plurality of personalization rules, a selection condition including corresponding action attribute information and selection information including distribution attribute information corresponding to the corresponding action attribute information; and
acquire action attribute information of action information to extract, from the plurality of received personalization rules, personalization rules including a corresponding selection condition that matches the acquired action attribute information, and select, from the plurality of received pieces of distribution information, distribution information having distribution attribute information indicated by selection information in the extracted personalization rules.

3. The information reception device according to claim 1, the one or more processors to execute the instructions to:
sum up frequencies of occurrence of pieces of action information and extract, from the plurality of received personalization rules, personalization rules including a corresponding selection condition that matches action information selected on the basis of a result of the summing-up.

4. A system comprising:
an information distribution device comprising:
a first memory storing first instructions; and
first one or more processors to execute the first instructions to:
store a plurality of pieces of distribution information representing advertisements;
generate a plurality of personalization rules, each of the plurality of personalization rules including a selection condition and selection information, wherein
the selection condition is generated based on information concerning at least one of a plurality of pieces of action information, which are extracted from actions of a user who uses the user's own device,
the selection information represents one the plurality of received pieces of distribution information and is generated by using information concerning at least another one of the plurality of extracted pieces of action information, and
the first one or more processors to execute the first instructions to:
associate, for each of a plurality of user identifications and from a plurality of pieces of action information from the plurality of user identifications, first type of action attribute information with second type of action attribute information to form a pair,
count a number of each unique pair of first type of action attribute information together with second type of action attribute information for all of the plurality of user identifications, and
rank the counted numbers of unique pairs to form at least a personalized rule including, as a combination of selection condition and selection information, a pair of first type of action attribute information together with second type of action attribute information; and
transmit the plurality of pieces of distribution information and the plurality of personalization rules; and
an information reception device comprising:
a second memory storing second instructions; and
second one or more processors to execute the second instructions to:
receive the plurality of personalization rules from the information distribution device;
receive the plurality of pieces of distribution information from the information distribution device;
acquire a piece of action information;
extract, from the plurality of received personalization rules, personalization rules based on a corresponding selection condition that matches the acquired piece of action information and select, from the plurality of received pieces of distribution information, a piece of distribution information indicated by selection information included in the extracted personalization rules; and
output the selected piece of distribution information.

5. The system according to claim 4, the first one or more processors to execute the first instructions to:
store, for each of the plurality of pieces of action information, action attribute information representing an attribute of the action information, and
store, for each of the plurality of pieces of distribution information, distribution attribute information representing an attribute of the distribution information,
extract, from the plurality of pieces of action information, a plurality of pieces of action attribute information of related pieces of action information, and
generate, for each of the plurality of personalization rules, the selection condition to include at least one of the plurality of extracted pieces of action attribute information, and the selection information to include at least another one of the extracted plurality of action attribute information.

6. The system according to claim 4, the first one or more processors to execute the first instructions to:
receive, for each of the plurality of pieces of action information, information representing the type of the action information;
extract, from the plurality of pieces of action information, a predetermined first type of action information and a predetermined second type of action information that are related to each other; and
generate, for each of the plurality of personalization rules, the selection condition based on the extracted first type of action information, and the selection information based on the extracted second type of action information.

7. The system according to claim 6, the first one or more processors to execute the instructions to:
when a type of action information is predetermined as the second type, extract a related combination out of combinations of action attribute information of the first type of action information and action attribute information of the second type of action information on the basis of the action information, and construct personalization rules including action attribute information of the first type of action information indicated by the extracted combination as the selection condition and action attribute information of the second type of action information indicated by the combination as selection information.

8. The information distribution device according to claim 7, the first one or more processors to execute the first instructions to:
collect a plurality of pieces of user identification information identifying a user of the plurality of pieces of action information; and
generate a combination of action attribute information of the first type of action information and action attribute information of the second type of action information for each of the plurality of pieces of user identification information, sum up the number of pieces of user identification information for which the same combination is generated, and construct personalization rules on the basis of a combination extracted on the basis of the result of the summing-up.

9. The system according to claim 4, the first one or more processors to execute the first instructions to:
acquire action frequency information representing a frequency of occurrence of an action indicated by the plurality of pieces of action information;
select a piece of distribution information selectable through selection information included in the plurality of personalization rules transmitted to the information reception device on the basis of action frequency information of action information that can match a selection condition in the one of the plurality of personalization rules, and
transmit the selected piece of distribution information to the information reception device.

10. The system according to claim 4, the first one or more processors to execute the first instructions to:
select the same piece of distribution information selectable according to a plurality of personalization rules including different selection conditions among the plurality of personalization rules transmitted to the information reception device, and transmit the selected piece of distribution information to the information reception device.

11. An information reception method comprising:
receiving, from an information distribution device, a plurality of pieces of distribution information representing advertisements;
receiving, from the information distribution device, a plurality of personalization rules, each of the plurality of personalization rules including a selection condition and selection information, wherein
the selection condition is generated based on information concerning at least one of a plurality of pieces of action information, which are extracted from actions of a user who uses the user's own device, and
the selection information represents one of the plurality of received pieces of distribution information and is generated by using information concerning at least another one of the plurality of extracted pieces of action information;
acquiring a piece of action information;
extracting, from the plurality of received personalization rules, personalization rules based on a corresponding selection condition that matches the acquired piece of action information and selecting, from the plurality of received pieces of distribution information, a piece of distribution information indicated by selection information included in the extracted personalization rules; and
outputting the selected piece of distribution information, wherein
for each of a plurality of user identifications and from a plurality of pieces of action information from the plurality of user identifications, first type of action attribute information with second type of action attribute information are associated to form a pair,
a number of each unique pair of first type of action attribute information together with second type of action attribute information is counted for all of the plurality of user identifications, and
the counted numbers of unique pairs are ranked to form at least a personalized rule including, as a combination of selection condition and selection information, a pair of first type of action attribute information together with second type of action attribute information.

12. A non-transitory computer-readable recording medium on which a computer program is recorded, the computer program causing a processor to execute:

receiving, from an information distribution device, a plurality of pieces of distribution information representing advertisements;

receiving, from the information distribution device, a plurality of personalization rules, each of the plurality of personalization rules including a selection condition and selection information, wherein the selection condition is generated based on information concerning at least one of a plurality of pieces of action information, which are extracted from actions of a user who uses the user's own device, and the selection information represents one of the plurality of received pieces of distribution information and is generated by using information concerning at least another one of the plurality of extracted pieces of action information;

acquiring a piece of action information;

extracting, from the plurality of received personalization rules, personalization rules based on a corresponding selection condition that matches the acquired piece of action information and selecting, from the plurality of received pieces of distribution information, a piece of distribution information indicated by selection information included in the extracted personalization rules; and outputting the selected piece of distribution information, wherein for each of a plurality of user identifications and from a plurality of pieces of action information from the plurality of user identifications, first type of action attribute information with second type of action attribute information are associated to form a pair, a number of each unique pair of first type of action attribute information together with second type of action attribute information is counted for all of the plurality of user identifications, and the counted numbers of unique pairs are ranked to form at least a personalized rule including, as a combination of selection condition and selection information, a pair of first type of action attribute information together with second type of action attribute information.

* * * * *